(12) United States Patent
Gokmen et al.

(10) Patent No.: US 11,188,826 B2
(45) Date of Patent: *Nov. 30, 2021

(54) SCALABLE ARCHITECTURE FOR IMPLEMENTING MAXIMIZATION ALGORITHMS WITH RESISTIVE DEVICES

(71) Applicant: International Business Machines Corporation, Armonk, NY (US)

(72) Inventors: Tayfun Gokmen, Briarcliff Manor, NY (US); Seyoung Kim, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 261 days.

This patent is subject to a terminal disclaimer.

(21) Appl. No.: 16/423,398

(22) Filed: May 28, 2019

(65) Prior Publication Data

US 2019/0279093 A1 Sep. 12, 2019

Related U.S. Application Data

(63) Continuation of application No. 14/868,505, filed on Sep. 29, 2015, now Pat. No. 10,387,778.

(51) Int. Cl.
*G06N 3/08* (2006.01)
*G06N 3/04* (2006.01)
(Continued)

(52) U.S. Cl.
CPC ............ *G06N 3/084* (2013.01); *G06N 3/049* (2013.01); *G06N 3/0635* (2013.01); *G06N 3/08* (2013.01); *G06N 20/00* (2019.01)

(58) Field of Classification Search
None
See application file for complete search history.

(56) References Cited

U.S. PATENT DOCUMENTS 5,491,650 A 2/1996 Barhen
5,657,263 A 8/1997 Lloyd et al.
(Continued)

OTHER PUBLICATIONS

Gao, L. et al., "Digital-to-Analog and Analog-to-Digital Conversion with Metal Oxide Memristors for Ultra-Low Power Computing," 2013 IEEE/ACM Intl. Symp. on Nanoscale Architectures (NANOARCH) (2013) pp. 19-22. (Year: 2013).*
(Continued)

*Primary Examiner* — Brian M Smith
(74) *Attorney, Agent, or Firm* — Cantor Colburn LLP; Stosch Sabo

(57) ABSTRACT

In some aspects, a method may include initializing a first array and a second array with a random voltage value, passing a forward pass by pulsing an input voltage value from an input of the first array and an input of the second array, and reading output voltage values at an output of the first array and an output of the second array. The method may further include passing a backward pass into the inputs of both of the first and second arrays, and reading voltage values at the inputs of the first and second arrays. The method may further include updating, with the first array, a first matrix update on the first array, updating, with the second array, a first matrix update on the second, and updating, with the second array, a second matrix update on the second array.

13 Claims, 21 Drawing Sheets

(51) Int. Cl.
*G06N 3/063* (2006.01)
*G06N 20/00* (2019.01)

(56) References Cited

U.S. PATENT DOCUMENTS

| | | | |
|---|---|---|---|
| 5,706,402 | A | 1/1998 | Bell |
| 5,991,193 | A | 11/1999 | Gallagher et al. |
| 6,078,938 | A | 6/2000 | Pan et al. |
| 6,424,960 | B1 | 7/2002 | Lee et al. |
| 6,876,053 | B1 | 4/2005 | Ma et al. |
| 6,974,981 | B2 | 12/2005 | Chidambarrao et al. |
| 7,254,500 | B2 | 8/2007 | Makeig et al. |
| 7,716,454 | B2 | 5/2010 | Fitton |
| 7,727,830 | B2 | 6/2010 | Jin et al. |
| 8,417,758 | B1 | 4/2013 | Rao et al. |
| 8,673,723 | B1 | 3/2014 | Na |
| 8,861,651 | B2 | 10/2014 | Aubert |
| 8,892,620 | B2 | 11/2014 | Jennings et al. |
| 8,898,056 | B2 | 11/2014 | Chan et al. |
| 8,969,155 | B2 | 3/2015 | Cheng et al. |
| 8,987,790 | B2 | 3/2015 | Cheng et al. |
| 8,993,417 | B2 | 3/2015 | Tsai et al. |
| 9,015,399 | B2 | 4/2015 | Brewer et al. |
| 9,031,816 | B2 | 5/2015 | Chen et al. |
| 9,111,222 | B2 * | 8/2015 | Aparin .................... G11C 11/54 |
| 9,245,979 | B2 | 1/2016 | Cai et al. |
| 9,299,705 | B2 | 3/2016 | Kanakasabapathy |
| 9,318,392 | B1 | 4/2016 | Leobandung |
| 10,387,778 | B2 * | 8/2019 | Gokmen .................... G06N 3/08 |
| 2004/0113174 | A1 | 6/2004 | Chidambarrao et al. |
| 2009/0008727 | A1 | 1/2009 | Yamauchi et al. |
| 2010/0070274 | A1 | 3/2010 | Cho et al. |
| 2015/0056781 | A1 | 2/2015 | Akarvardar et al. |
| 2015/0060959 | A1 | 3/2015 | Lin et al. |
| 2015/0102409 | A1 | 4/2015 | Cheng et al. |
| 2015/0170025 | A1 | 6/2015 | Wu et al. |
| 2017/0091616 | A1 | 3/2017 | Gokmen et al. |
| 2017/0091618 | A1 | 3/2017 | Gokmen et al. |
| 2017/0091620 | A1 | 3/2017 | Gokmen et al. |
| 2017/0091621 | A1 | 3/2017 | Gokmen et al. |
| 2017/0141211 | A1 | 5/2017 | Xie et al. |
| 2018/0350433 | A1 | 12/2018 | Hu |

OTHER PUBLICATIONS

Adhikari, S.P. et al., "A Circuit-Based Learning Architecture for Multilayer Neural Networks With Memristor Bridge Synapses," IEEE Trans. on Circuits and Systems, vol. 62, No. 1 (Jan. 2015) pp. 215-223. (Year: 2015).

Amari, S., et al.," A New Learning Algorithm for Blind Signal Separation", Advances in Neural Information Processing Systems, 1996, pp. 1-7.

Bell, Anthony J. et al.,"An Information-Maximization Approach to Blind Separation and Blind Deconvolution", Neural Computation, vol. 7, No. 6, 1995, pp. 1129-1159.

Polycarpou, M., et al.,"A Neural-Type Parallel Algorithm for Fast Matrix Inversion", Fifth International Parallel Processing Symposium,Apr. 30-May 2, 1991, pp. 1-6.

Singh, C., et al.,"VLSI Architecture for Matrix Inversion using Modified Gram-Schmidt based QR Decomposition", 20th International Conference on VLSI Design, IEEE, Jan. 2007, pp. 1-6.

Soudry , D. et al., "Memristor-based multilayer neural networks with online gradient descent training," IEEE Trans. on Neural Networks and Learning Systems, vol. 26, No. 10 (Oct. 2015) pp. 2408-2421 . (Year: 2015).

Suri, M., et al.,"Exploiting Intrinsic Variability of Filamentary Resistive Memory for Extreme Learning Machine Architectures," IEEE Transactions on Nanotechnology, vol. PP, Issue:99, Jun. 15, 2015, pp. 1-7.

Xie, L. et al., "Interconnect Networks for Memristor Crossbar," Proc. of the 2015 IEEE/ACM Intil. Symp. on Nanoscale Archtectures (NANOARCH '15) pp. 124-129. (Year: 2015).

* cited by examiner $$W \times B = C$$

$$\begin{pmatrix} w_{11} & w_{12} & w_{13} \\ w_{21} & w_{22} & w_{23} \\ w_{31} & w_{32} & w_{33} \end{pmatrix} \times \begin{pmatrix} b_{11} & b_{12} & b_{13} \\ b_{21} & b_{22} & b_{23} \\ b_{31} & b_{32} & b_{33} \end{pmatrix} = \begin{pmatrix} 1 & 0 & 0 \\ 0 & 1 & 0 \\ 0 & 0 & 1 \end{pmatrix}$$

FIG. 2

SCALABLE ARCHITECTURE FOR IMPLEMENTING MAXIMIZATION ALGORITHMS WITH RESISTIVE DEVICES

DOMESTIC PRIORITY

This application is a continuation of U.S. application Ser. No. 14/868,505, filed Sep. 29, 2015 and titled "Scalable Architecture for Implementing Maximization Algorithms with Resistive Devices" the contents of which are incorporated by reference herein in its entirety.

BACKGROUND

The present disclosure relates to scalable architectures for implementing maximization algorithms, and more specifically, to scalable architecture for implementing maximization algorithms with resistive devices.

Information maximization algorithms are algorithms for optimizing artificial neural networks and other information processing systems. These types of algorithms may be implemented a function that maps a set of input values I to a set of output values O, which may be chosen or learned so as to maximize the average Shannon mutual information between I and O, subject to a set of specified constraints and/or noise processes. Some information maximization algorithms may be self-learning algorithms configured to optimize this process. Self-learning information maximization algorithms may self-improve without any teacher signals. The learning process may be described as setting matrix weight updates such that the output units become, statistically speaking, as independent as possible.

Some exemplary applications of information maximization algorithms may be demonstrated as "blind source separation" problems where a plurality of inputs are grouped together as single data source, and the inputs are then separated and analyzed individually as a function of the system architecture. For example, group of microphones randomly placed in a crowded room may pick up 10 voices with varying intensities, from 10 speakers, who are all in the room, each saying something different. In a blind source separation scenario, the information source to be maximized is the audio feed having the various voices from all of the microphones. The information maximization algorithm in this scenario may take the audio feed as a mixed input, determine who is speaking in the audio feed, and determine what each speaker is actually saying. The output of this exemplary algorithm may be 10 separate signals, each identifying the speaker and having the speaker's voice isolated as an independent source.

Current methods for computation of maximization algorithms often utilize von Neumann architecture. Accordingly, the time spent to complete the maximization task that includes matrix operations with $N^2$, where N is the number of original and independent sources in the problem. In von Neumann architecture, the time factor needed for computation propagates quadratically with N because the matrix operations (such as vector-matrix multiplication) are computed serially by the processor. However, using conventional computing architecture, matrix operations on systems having a larger number of independent sources (e.g., N=1000 or more) may become computationally expensive for real-time (analog) computing applications.

SUMMARY

In one exemplary embodiment, a method for performing matrix operations on a matrix with a network of resistive device arrays is described. The method may include initializing a first array and a second array with a random voltage value and passing a forward pass by pulsing an input voltage value from an input of the first array and an input of the second array, and reading output voltage values at an output of the first array and an output of the second array. The method may further include passing a backward pass by pulsing voltage values into the inputs of both of the first and second arrays, wherein the voltage values are voltage values at the outputs of the first and second arrays, and reading voltage values at the inputs of the first and second arrays by adding the output voltage of the first and second arrays. The method may further include updating, with the first array, a first matrix update on the first array by directing the voltage values at the inputs of the first and second arrays into the inputs and the outputs of the first and second arrays, updating, with the second array, a first matrix update on the second array by inputting a constant voltage value from the input of the first array and the second array, and reading constant voltage values at the output of the second array, and updating, with the second array, a second matrix update on the second array by outputting a matrix sum of output voltage values at the outputs of the first and second arrays, wherein the sum is made by adding the output voltage value at the output of the first array to the output voltage value at the output of the second array.

According to another embodiment, a system for performing matrix operations with a network of resistive device arrays is described. The system may include a processor configured to initialize a first array and a second array with a random voltage value, and pass a forward pass by pulsing an input voltage value from an input of the first array and an input of the second array, and reading output voltage values at an output of the first array and an output of the second array. The processor may be further configured to pass a backward pass by pulsing voltage values into the inputs of both of the first and second arrays, where the voltage values are voltage values at the outputs of the first and second arrays, and reading voltage values at the inputs by adding the outputs of the first and second arrays. The processor may be further configured to update, with the first array, a first matrix update on the first array by directing an input voltage value from the inputs of the first and second arrays into the inputs and the outputs of the first and second arrays, update, with the second array, a first matrix update on the second array by inputting a constant voltage value from the input of the first array and the second array, and reading voltage values at the output of the second array, and update, with the second array, a second matrix update on the second array by outputting a matrix sum of output values at the outputs of the first and second arrays, where the sum is made by adding the output voltage value at the output of the first array to the output voltage value at the output of the second array.

According to yet other embodiments, a non-transitory computer-readable storage medium is described. The non-transitory computer-readable storage medium may store computer-executable instructions configured to cause a processor to perform a method for performing matrix operations on a matrix with a network of resistive device arrays. The method may include initializing a first array and a second array with a random voltage value and passing a forward pass by pulsing an input voltage value from an input of the first array and an input of the second array, and reading output voltage values at an output of the first array and an output of the second array. The method may further include passing a backward pass by pulsing voltage values into the inputs of both of the first and second arrays, wherein the voltage values are voltage values at the outputs of the first and second arrays, and reading voltage values at the inputs of the first and second arrays by adding the output voltage of the first and second arrays. The method may further include updating, with the first array, a first matrix update on the first array by directing the voltage values at the inputs of the first and second arrays into the inputs and the outputs of the first and second arrays, updating, with the second array, a first matrix update on the second array by inputting a constant voltage value from the input of the first array and the second array, and reading constant voltage values at the output of the second array, and updating, with the second array, a second matrix update on the second array by outputting a matrix sum of output voltage values at the outputs of the first and second arrays, wherein the sum is made by adding the output voltage value at the output of the first array to the output voltage value at the output of the second array.

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 depicts an exemplary mathematical model for performing matrix operations, according to some exemplary embodiments;

DETAILED DESCRIPTION

Figure 1:
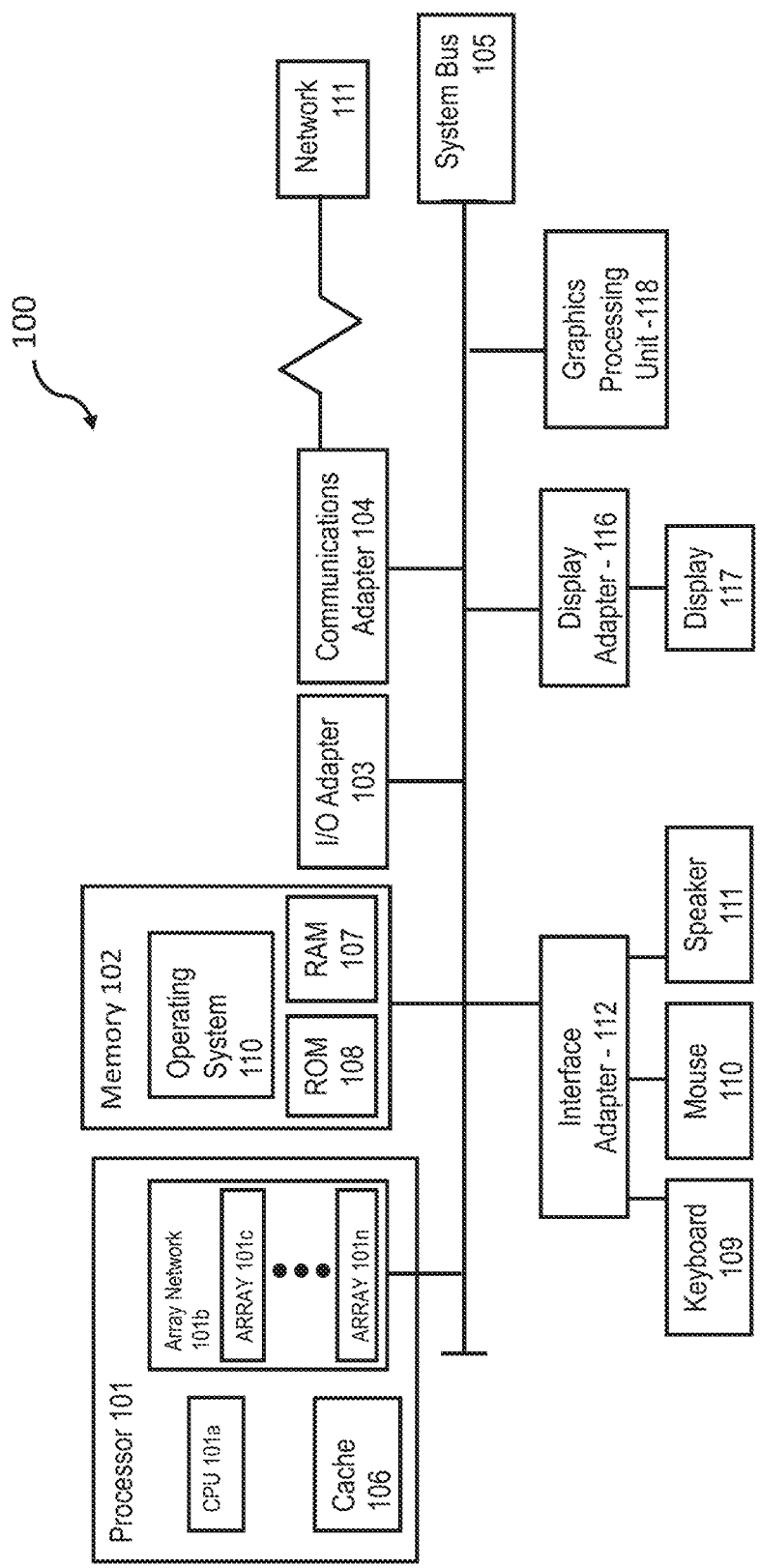
FIG. 1 illustrates a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, and have software (e.g., firmware) components, or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer with one or more neural networks operatively connected to computer 100. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Memory 102 may be operatively coupled to one or more internal or external memory devices 109. Communications adaptor 104 may be operatively connect computer 100 to one or more networks 111. System bus 105 may also connect one or more user interfaces via interface adaptor 112. Interface adaptor 112 may connect a plurality of user interfaces to computer 100 including, for example, keyboard 109, mouse 110, speaker 111, etc. System bus 105 may also connect display adaptor 116 and display 117 to processor 101. Processor 101 may also be operatively connected to graphical processing unit 118.

Processor 101 is a hardware device or a plurality of hardware devices for executing hardware instructions or software, particularly that stored in a non-transitory computer-readable memory (e.g., memory 102). Processor 101 can include any custom made or commercially available processor, a central processing unit (CPU), a plurality of CPUs, for example, CPU 101a, an auxiliary processor among several other processors associated with the computer 101, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Processor 101 may also include an array network 101b. The array network may include a plurality of resistive device arrays, e.g., array 101c-101n. Resistive device arrays 101c to 101n may include one or more networks of arrays comprised of resistive devices configured to function as weighted connections. The resistive device arrays may be configured to perform embodiments described herein.

Resistive storage devices, as embodied herein, may include a resistive device, a memristor, a resistive random access memory (RRAM), a resistive random access memory (ReRAM), one or combination of volatile memory elements (e.g., double data rate random access memory (DDRAM), dynamic random access memory (DRAM), static random access memory (SRAM), synchronous dynamic random access memory (SDRAM), a resistive cross point device, and/or be a resistive cross point array, a resistive processing unit (RPU) device, etc. For example, according to some embodiments, a RPU device may be configured to perform weight updates on matrices.

Memory 102 can include random access memory (RAM) 107 and read only memory (ROM) 108. RAM 107 can be any one or combination of volatile memory elements (e.g., DDRAM, DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 113. Operating system 110 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 110. Other output devices, e.g., speaker 111 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 111.

Network 111 can be an IP-based network for communication between computer 100 and any external device. Network 111 transmits and receives data between computer 100 and external systems. In an exemplary embodiment, network 111 can be a managed IP network administered by a service provider. Network 111 may be implemented in a wireless fashion, e.g., using wireless protocols and technologies, such as WiFi, WiMax, etc. Network 111 can also be a packet-switched network such as a local area network, wide area network, metropolitan area network, Internet network, or other similar type of network environment. The network 111 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 113, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Referring now to FIG. 2, an exemplary mathematical model for performing matrix operations is depicted, according to some embodiments. Matrix inversion is the process of finding the matrix W that satisfies the equation of FIG. 2 for a given invertible matrix B. Matrix inversion plays a significant role in many computing applications. For example, MIMO (Multiple-Input, Multiple-Output) technology in wireless communications may frequently compute matrix inversions in the application. MIMO system often consist of N transmit and M receive antennas. In MIMO systems, unique signals, often occupying the same frequency band, may be sent via the N transmit antennas and be received via the M receive antennas. The signals arriving at each receive antenna may be a linear combination of the N transmitted signals forming a N×M transmission matrix H. With conventional MIMO systems, it is often crucial for the matrix H to be invertible for the receiver to be able to figure out the transmitted information. As another example, matrix inversion can play a significant role in computer graphics, particularly in 3D graphics rendering and 3D simulations. Examples of graphics applications can include screen-to-world ray casting, world-to-subspace-to-world object transformations, and physical simulations. However, using conventional matrix inversion using conventional computing architectures (e.g., von Neumann), matrices having large numbers of independent sources may require extraordinary computing resources that may not be immediately available, due to the number of computations needed to solve higher order matrix inversion. In some aspects, "real time" analog computing that utilize solutions to inverted matrices representing large numbers of independent sources may be untenable using conventional methods.

Accordingly, real-time computing applications may benefit from scalable computing architectures and methods that provide fast mathematical solutions equivalent to matrix inversion, but without the computational time complexity of inverting the matrix using conventional computing architectures. Accordingly, architectures that include networks of resistive device arrays may be configured to perform analog matrix operations in parallel, which may save computational steps and time. Moreover, the resistive device arrays may be configured to apply self-learning algorithms. Finally, systems may also benefit from hardware-implemented resistive device array architectures configured to perform analog actual matrix inversion in fewer computational steps than conventional computing methods.

Figure 3:
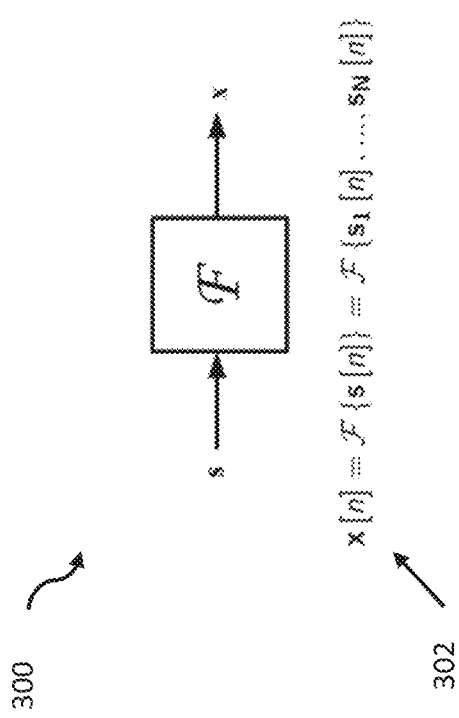
FIG. 3 depicts a flow diagram of an exemplary mixing model, according to some embodiments.

FIG. 3 depicts a block diagram of an exemplary mixing model 300, according to some embodiments. Model 300 is a general mathematical approach used to solve problems where several sources having unclear origins are mixed together. In general, model 300 may receive an input, mix the input, and output a mixed signal. For example, as shown in FIG. 3, input s may include a plurality of independent data sources. F depicts a mixing mechanism (e.g., the mixing operator). Equation 302 provides for output x, where s[n] is the vector of N original and independent sources, F is a mixing operator and x[n] is the vector of observed signals. Using the above illustration of the microphone problem, the mixing operator F may be the box that characterizes the medium that mixes the each of the 10 speaker voices signals before they are received by the microphones and outputs signals measured by each microphone to which the maximization algorithm is applied.

Figure 4:
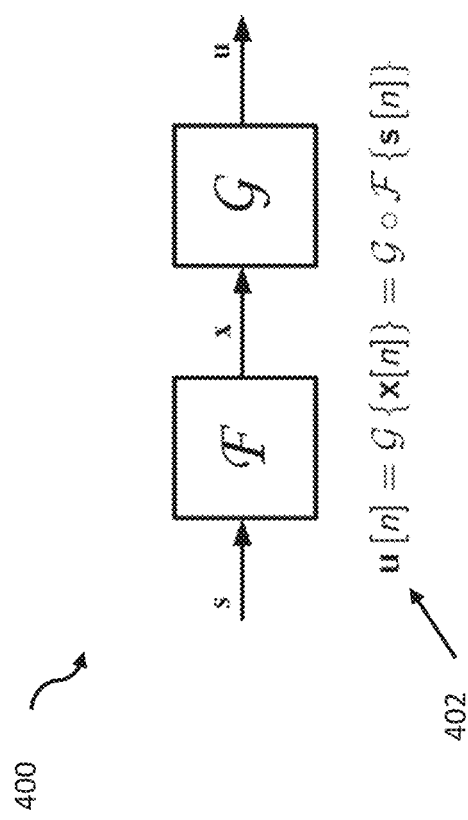
FIG. 4 depicts a flow diagram of a mixing and de-mixing model according to some embodiments.

Referring now to FIG. 4, a block diagram of a mixing and de-mixing model 400 is depicted, according to some exemplary embodiments. Operator G (shown as 402) may be a recovering or de-mixing operator, and u[n] may be the source estimate. The problem of maximizing the mutual information between the input vector x and an invertible nonlinear transform of it, y may be obtained as $y=h(u)=h(Wx)$, where h(u) may be a nonlinear transformation of source estimate u, and Wx may be a weight matrix having mixed input x.

As previously discussed, a maximization of the input vector with respect to its nonlinear transformation h may be advantageous because only statistically independence sources may be useful for Independent Component Analysis (ICA). The solution to this problem may be found using a variety of several ICA algorithms, such as, for example, FastICA, JADE, and InfoMax. The InfoMax algorithm, for example, addresses the problem of maximizing the mutual information I(y:x), between the input vector x and an invertible nonlinear transform of it, y, obtained as $y=h(u)=h(Wx)$, where W is the N×N de-mixing matrix and $h(u)=[h_2(u_1), \ldots h_N(u_N)]^T$ is a set of N nonlinear functions. In known methods, the network used to perform the InfoMax algorithm may be a single layer neural network. In this way, the set of the nonlinear functions may be activation functions of the neural network. For this reason, the functions $h_1(u_1)$, are usually called activation functions or AEs.

Figure 5:
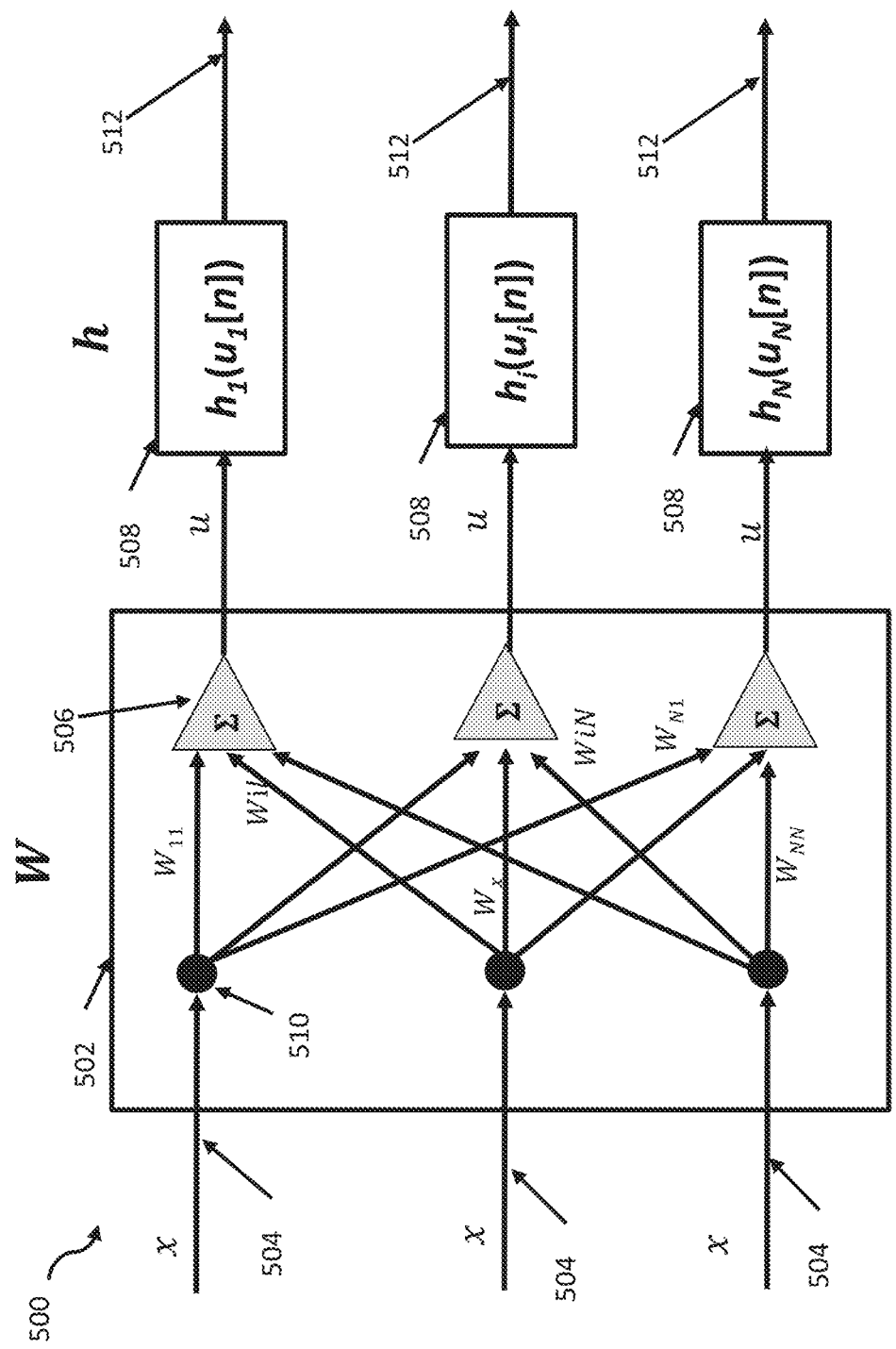
FIG. 5 depicts a flow diagram of a conventional linear de-mixing model followed by non-linear transformations.

FIG. 5 depicts an exemplary single layer neural network 500 implementing an InfoMax algorithm in hardware. The neural network depicted here may include one or more resistive device arrays 502 having neural nodes 510 configured to receive a plurality of mixed inputs 504 (depicted in FIG. 5 as inputs x), sum the signals at block 506, and output signals u. Network 500 may transform output signal u at transformation 508. Transformation 508 may take the form, for example, $(h_N(u_N[n])$, and output signal u as a de-mixed output 512. Similar to the de-mixing mathematical model discussed above, n may represent the number of individual independent sources, and the function $H_i(u_i)$ may be the activation function.

Figure 6:
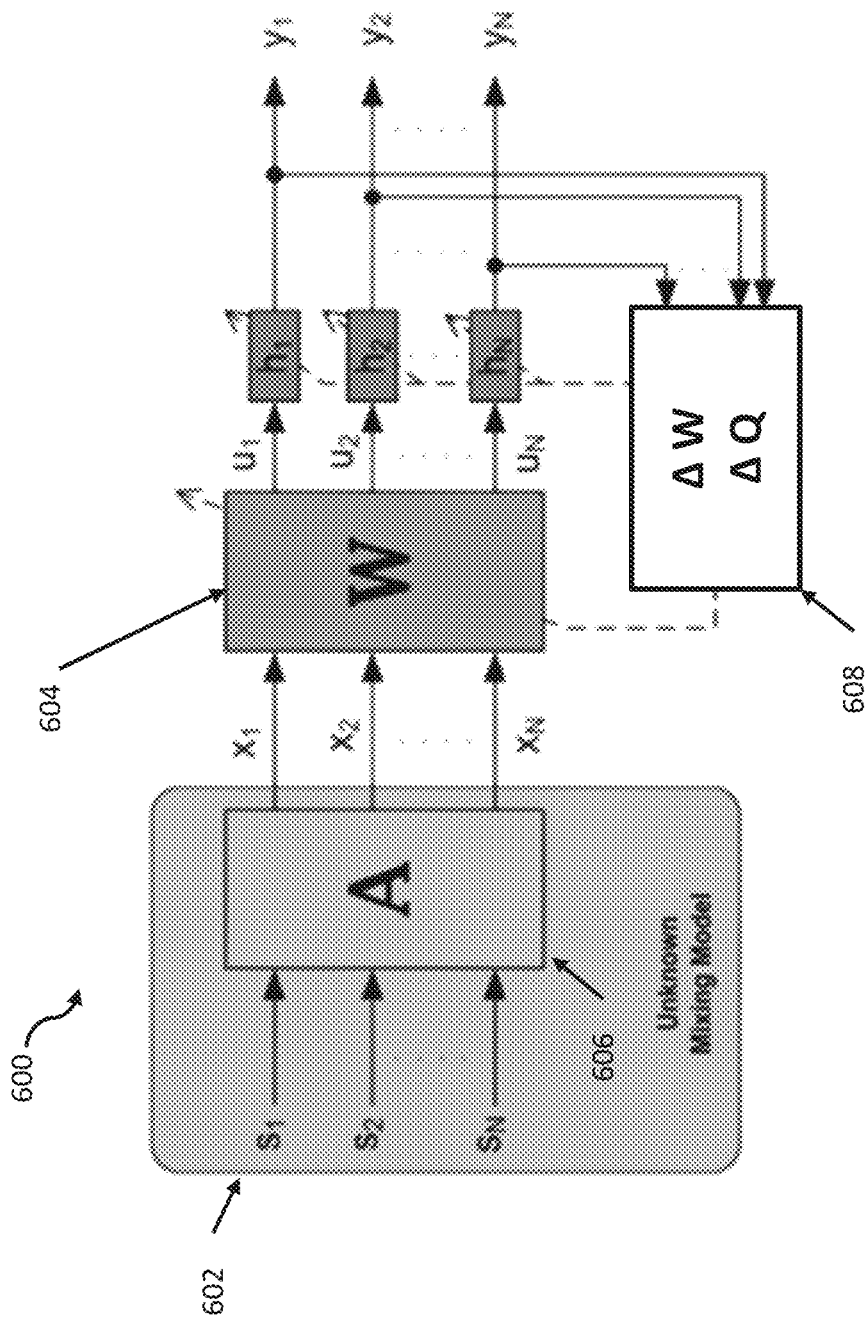
FIG. 6 depicts a flow diagram of a single layer neural network with resistive devices arrays in learning mode according to some exemplary embodiments.

FIG. 6 depicts a flow diagram of a network composed of resistive device arrays 600 (hereafter "network 600") having the arrays configured in learning mode, according to some exemplary embodiments. Referring now to FIG. 6, system 600 exemplifies a cost function network configured to measure the statistic independence of the network output y. An unknown mixing model 602 may receive independent inputs $S_N$. Using the microphone input example, each input s may be the input of each speaker's voice where each microphone receives the mixture of unique speaker's voice. Mixing model 602 may receive the signals as a un-mixed input S, and output mixed output $x_N$.

According to some embodiments, system 600 may process mixed signals $x_N$ in a matrix 604 (depicted as matrix W). System 600 may optimize the statistic independence of the network output cost function measuring y, and then change the free parameters (matrix weights, or nonlinear function parameters) at learning block 608. Learning block 608 may apply one or more learning rules for the weight matrix W. For example, a learning rule may be mathematically represented by the equation $$\Delta W = W^{-T} + \Psi_x^T \quad (1)$$

where $W^{-T}$ may be the transpose of the inverse of the weight matrix W, and $\Psi_k$ may be a nonlinear transformation such that $$\psi_k = \frac{h_k''(u_k)}{h_k'(u_k)}. \quad (2)$$

The learning rule for the weight matrix W as shown in equation (1) can involve taking the inverse of the matrix W itself. In current systems not implementing embodiments described herein, this operation can be costly in a computational sense, and may not be performed using local information. According to some embodiments, system 600 may apply non-linear transformations h to the output $u_n$ of inverted matrix W, then apply iterative updates at block 608. By iteratively applying matrix updates 608, system 600 may output analog solutions to matrix W that are equivalent to solutions to matrix inversion. One benefit of the learning algorithm architecture of network 600 may be fast output of solutions for high numbers of independent inputs. Expressed mathematically, the learning algorithm expressed in the hardware of network 600 may take the form $$\Delta W = (1 + \Psi_u^T) W, \quad (3)$$

where $\Delta W$ is the updated weight matrix W. According to some embodiments, the architecture of system 600 may implement learning algorithms (e.g., Equation (3)) using resistive devices as the weight matrix W.

Network 600 depicts a fully parallel and scalable architecture that can perform the learning algorithms using resistive devices, for example, RRAM and CMOS neurons that make analog updates to matrix W in real time. In some aspects, resistive devices can be used as the connection weights between the neurons, whereas neurons may be responsible for computing the non-linear function (e.g., $\Psi_k$ of Equation 2).

According to some embodiments, the learning algorithm of network 600 can generally include the steps of (1) performing forward computation on the input mixed signals by performing linear transformations using matrix W followed by non-linear transformations, (2) backward computation on the output of step (1), (3) diagonal weight reading, and (4) performing matrix weight updates. In some aspects, resistive devices configured as the connections between input and output neurons may be responsible for storing the weights and updating the weights by processing the signals generated by the neurons in parallel.

According to some embodiments, the resistive devices (e.g., PRAM devices, DDRAM, etx.) may be configured as networks of resistive device arrays. The arrays may perform portions of the calculation in parallel. Because of this parallelism, network 600 may perform all 4 steps mentioned above at some constant time independent of the number of weights (e.g., neurons) in the network. Stated in another way, the time and number of steps needed to produce a solution may be unrelated to the size of the matrix at issue, because portions of the computation may be analog and system 600 may perform the computational portions in parallel.

Figure 7:
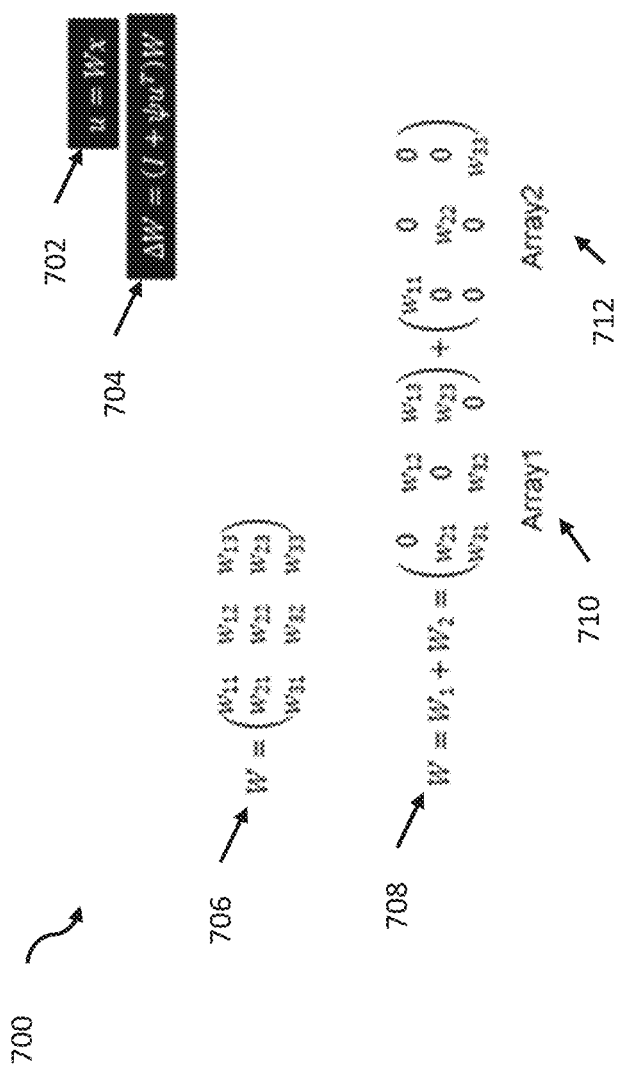
FIG. 7 depicts a mathematical model for performing matrix multiplication with a network of resistive device arrays according to some exemplary embodiments.

FIG. 7 depicts a mathematical model 700 for performing matrix multiplication with a network of resistive device arrays, according to some embodiments. FIG. 7 show the mathematical model of the separation of the diagonal terms from the off-diagonal terms for the matrix storage operations. Equation 704 may provide for a linear transformation of matrix W (as discussed above with respect to Equation (2)). Exemplary matrix 706 is depicted as a 3×3 matrix, although matrices having other numbers of independent sources are contemplated.

According to some embodiments, system 600 may perform forward computation and backward computation by applying a linear transformation u (e.g., block 604) to matrix W, and apply an iterative update 704 by applying operations as signal propagations through a network of resistive device arrays. For example, system 600 may include two neural arrays (710 and 712) configured to perform matrix multiplication with a network of resistive device arrays. In some embodiments the first and second arrays 710 and 712 may each respectively include an input and an output. As depicted in model 700, the system may output a solution for W by neural arrays 710 and 712.

Figure 8:
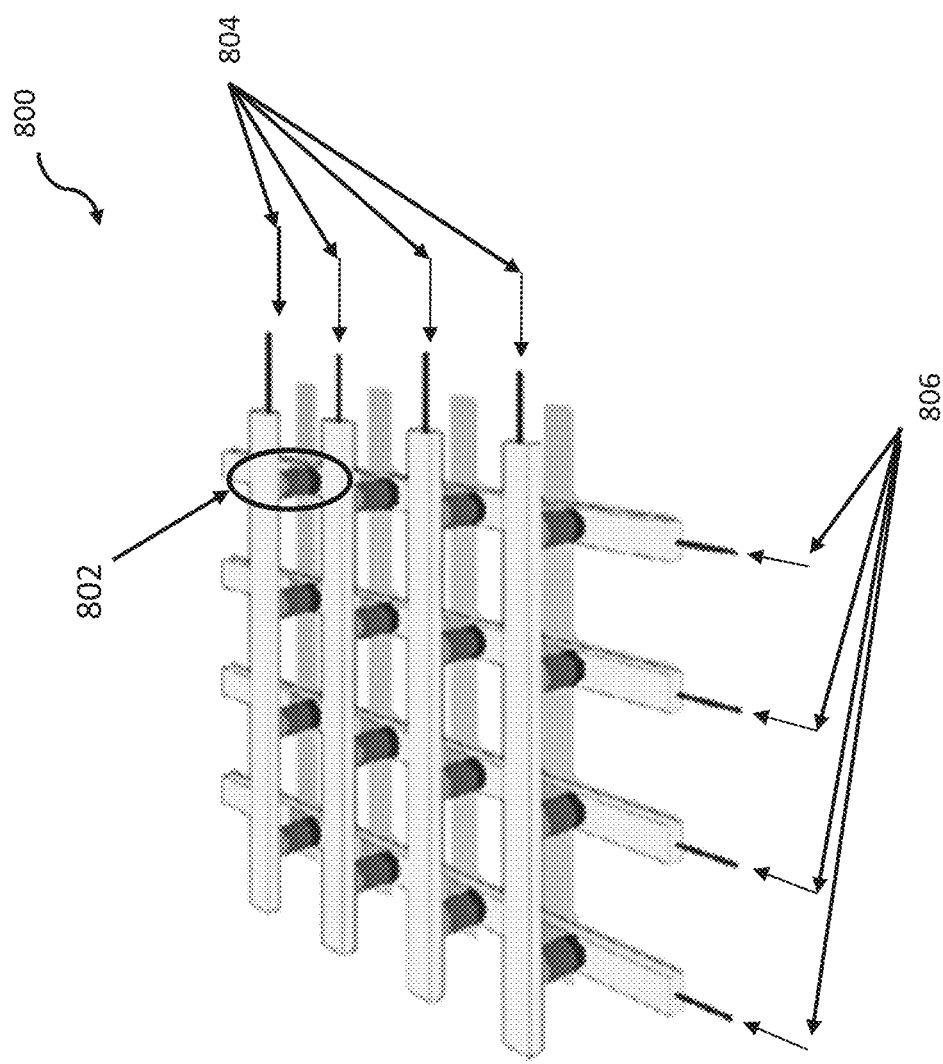
FIG. 8 depicts a resistive device array according to some exemplary embodiments.

FIG. 8 depicts a 2D cross-point device array 800, according to some exemplary embodiments. 2D cross-point device array 800 may include a plurality of resistive devices 802 configured to function as the weighted connections between the neurons of the system. These weighted connections 802 may receive information in the form of voltage pulses through columns 806 and rows 804.

At the intersection of some rows and columns, resistive device 802 may receive an input signal from a feed line (e.g., columns 806), transform the input, and transmit the transformed input to a row 804 in connection with the resistive device 802. In some aspects, resistive devices 802 may function as weights by retaining input values in the form of conductance. Each resistive device array 800 can receive voltage pulses through pathways 804 and 806 in parallel according to system architecture, and store weight values without the necessity of auxiliary circuits. Resistive device array 800 may be configured into a network of resistive device arrays. For example, network 800 may be configured to include two arrays of resistive devices.

Figure 9:
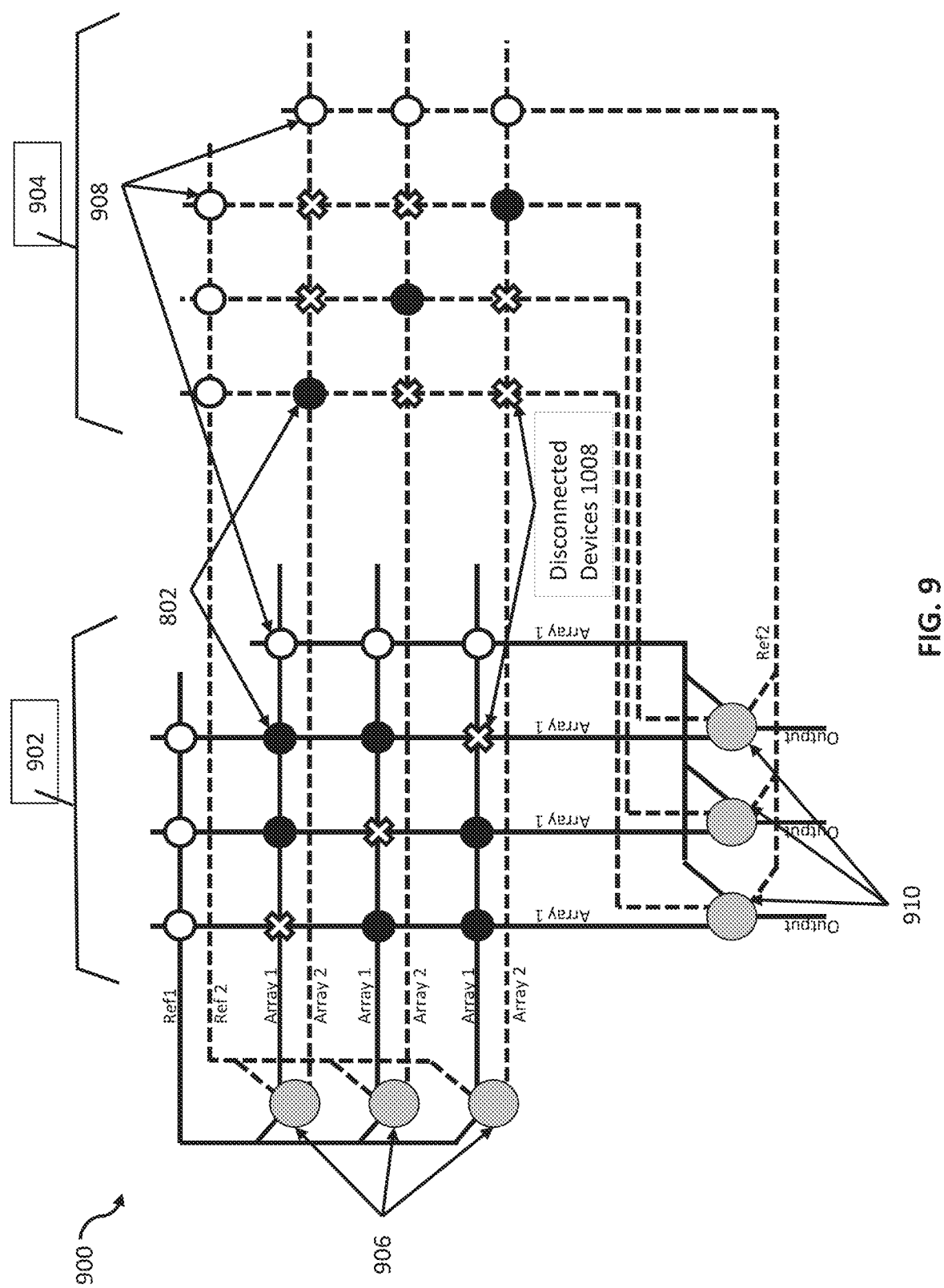
FIG. 9 depicts a flow diagram of a network of resistive device arrays according to some exemplary embodiments.

Referring now to FIG. 9, a network of resistive device arrays 900 is depicted according to some exemplary embodiments. Network 900 is depicted here having two neural arrays 902 and 904, each array comprising a 3×3 array of resistive devices 802. Network 900 may include input neurons 906 and output neurons 910. As an example, in the microphone problem discussed previously, the plurality of microphone input signals may be fed to neural inputs 906 as a mixed signal having 3 independent sources. Inputs 906 may provide input to both arrays in the network. Although network 900 depicts two 3×3 arrays 902 and 904, it is appreciated that arrays may include any order of neurons configured with respect to the size of matrices to be computed by the system. In other words, N=3 is exemplary only and is not meant to be limiting. Neural inputs/outputs 906 and 910 may be CMOS circuitry comprising conventional CMOS devices.

A set of reference weights 908 have a fixed resistance and combine their outputs into a reference current that is provided to each of the neurons 910 or 906. Because conductance values can only be positive numbers, some reference conductance may be needed to encode both positive and negative values in the matrix. The currents produced by the weights 802 may be continuously valued and positive, and therefore the reference weights 908 can be used to provide a reference current, above which currents are considered to have positive values and below which currents are considered to have negative values.

As an alternative to using the reference weights 908, according to some embodiments, separate arrays of weights 802 may capture negative values. Each approach may have advantages and disadvantages. For example, using the reference weights 908 can be more efficient in chip area, but reference values need to be matched closely to one another. In contrast, the use of a separate array for negative values may not involve close matching as each value has a pair of weights to compare against. However, the negative weight matrix approach can use roughly twice the chip area as compared to the single reference weight column. In addition, the reference weight column may generate a current that may need to be copied to each neuron for comparison, whereas a negative matrix array can provide a reference value directly for each neuron. In the negative array embodiment, the weights 802 of both positive and negative arrays may be updated, but this can also increase signal-to-noise ratio as each weight value is a difference of two conductance values. The two embodiments may provide identical functionality in encoding a negative value and those having ordinary skill in the art will be able to choose a suitable embodiment for the application at hand.

Conventional resistive device array computing systems generally include a single neural array. As a result of the single array architecture, diagonal terms and off-diagonal terms of subject matrices may be calculated serially. Accordingly, conventional neural computing systems may experience computing constraints with high time complexities when calculating problems having large number of independent sources. According to some embodiments, the computation time may be significantly improved by computing diagonal terms of the matrix in one array, computing the off-diagonal terms in a second array, updating the terms, and providing the computations as a sum of the outputs of the two arrays.

Referring again to FIG. 9, array 902, which is depicted as the left-most Array 1, may be configured to process the off-diagonal terms of a matrix (e.g., the diagonal terms of weight matrix W discussed above). The right-most array of network 900, (depicted in FIG. 9 as the right-most Array 2), may be configured to process the diagonal terms of the matrix. In general, as a signal is input at input 902, the signal may propagate through array 1 as a linear transformation (e.g., vector-matrix multiplication may be performed by array 1 on the off-diagonal terms as the signal propagates through the array) while array 2 simultaneously performs the vector-matrix multiplication on the diagonal terms. Resistive devices 802 may store matrix values as conductance. Resistive devices 802 may also be configured to store static reference resistances 908 as a reference value in order to be able to encode negative values in the arrays.

Since each array may be configured to perform a predetermined portion of the matrix calculation, not all nodes may be active. For example, FIG. 9 shows exemplary disconnected devices 908, which may not be active or allow voltage pulses to pass based on the predetermined configuration of the array.

Figure 10:
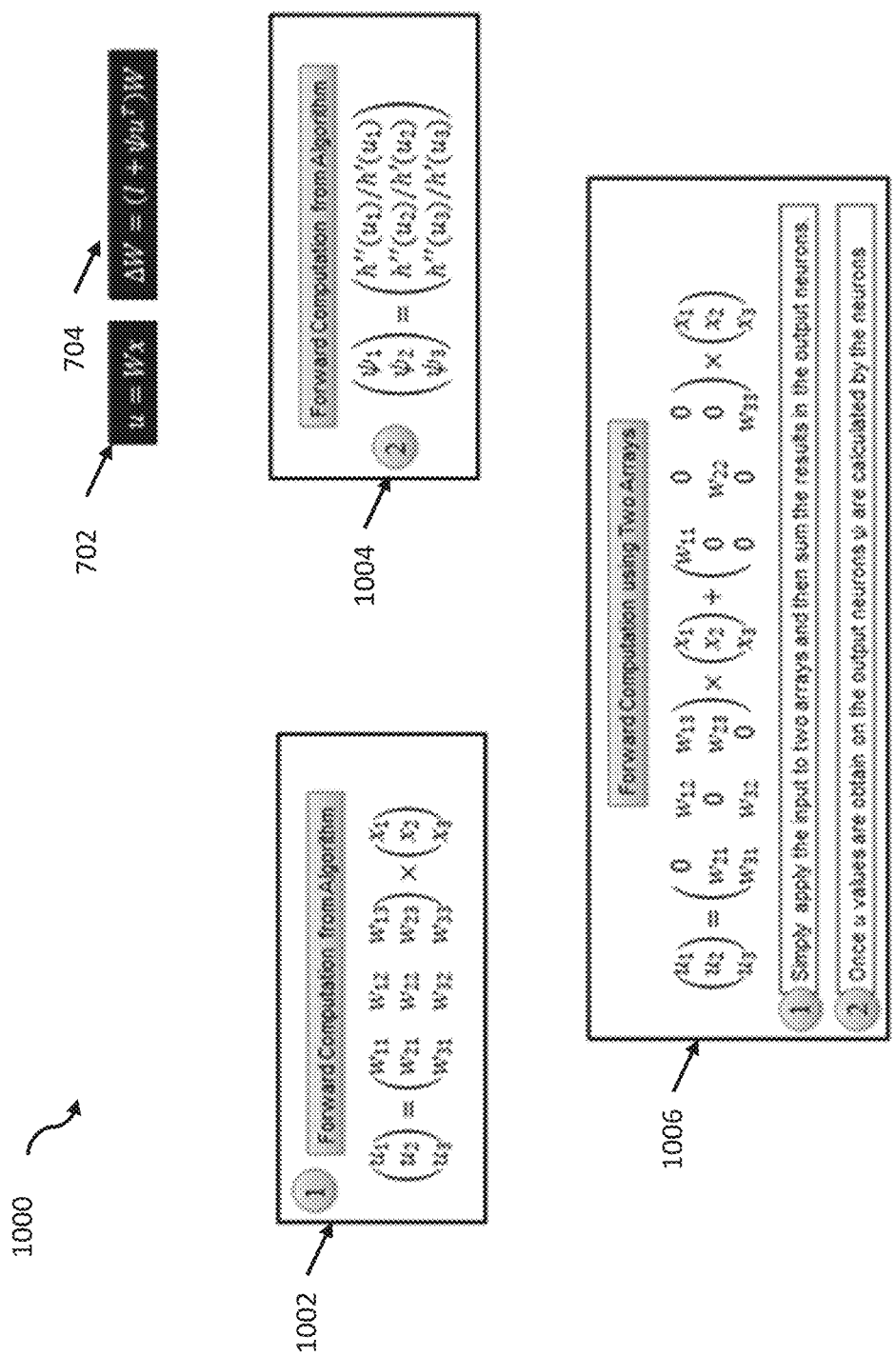
FIG. 10 depicts a mathematical model for forward computation of a neural network composed of resistive device arrays according to some embodiments.

FIG. 10 depicts a mathematical model 1000 for forward computation of a matrix with a network of resistive device arrays, according to some embodiments. Referring now to FIG. 10, model 1000 depicts a linear transformation of matrix 706(W), as defined in Equation 702. At block 1004, model 1000 shows an equation performed on output nodes 910. According to some embodiments, as depicted in block 1006, a forward computation may include calculating input vectors $x_1$, $x_2$ and $x_3$ (collectively, $x_i$). The output of the vector matrix multiplication in block 1004 may provide diagonal terms $u_1$, $u_2$, and $u_3$ (collectively, $u_i$). Simultaneously, according to some embodiments, the system (e.g., network 900) may calculate the nonlinear terms $y_1$, $y_2$, and $y_3$ (collectively, $y_i$), by performing the nonlinear transformation as shown at block 1004.

Block 1006 depicts performing the forward calculation by separating matrix in to the two arrays (e.g., arrays 902 and 904), and then multiplying x by the diagonal terms and the off-diagonal terms separately. Accordingly, the system may apply update rule 704 by taking a sum of the simultaneous outputs of arrays 902 and 904 (depicted as Arrays 1 and 2).

According to some embodiments, a hardware application of mathematical model 1000 may provide efficient and streamlined computation of high order matrices. By way of comparison, systems employing conventional architectures generally hold diagonal and off-diagonal terms in the same neural network, and perform the diagonal and off-diagonal calculations serially. As discussed above, in higher order problems the serial calculation of matrix terms comes at a significant cost in computational time.

Figure 11:
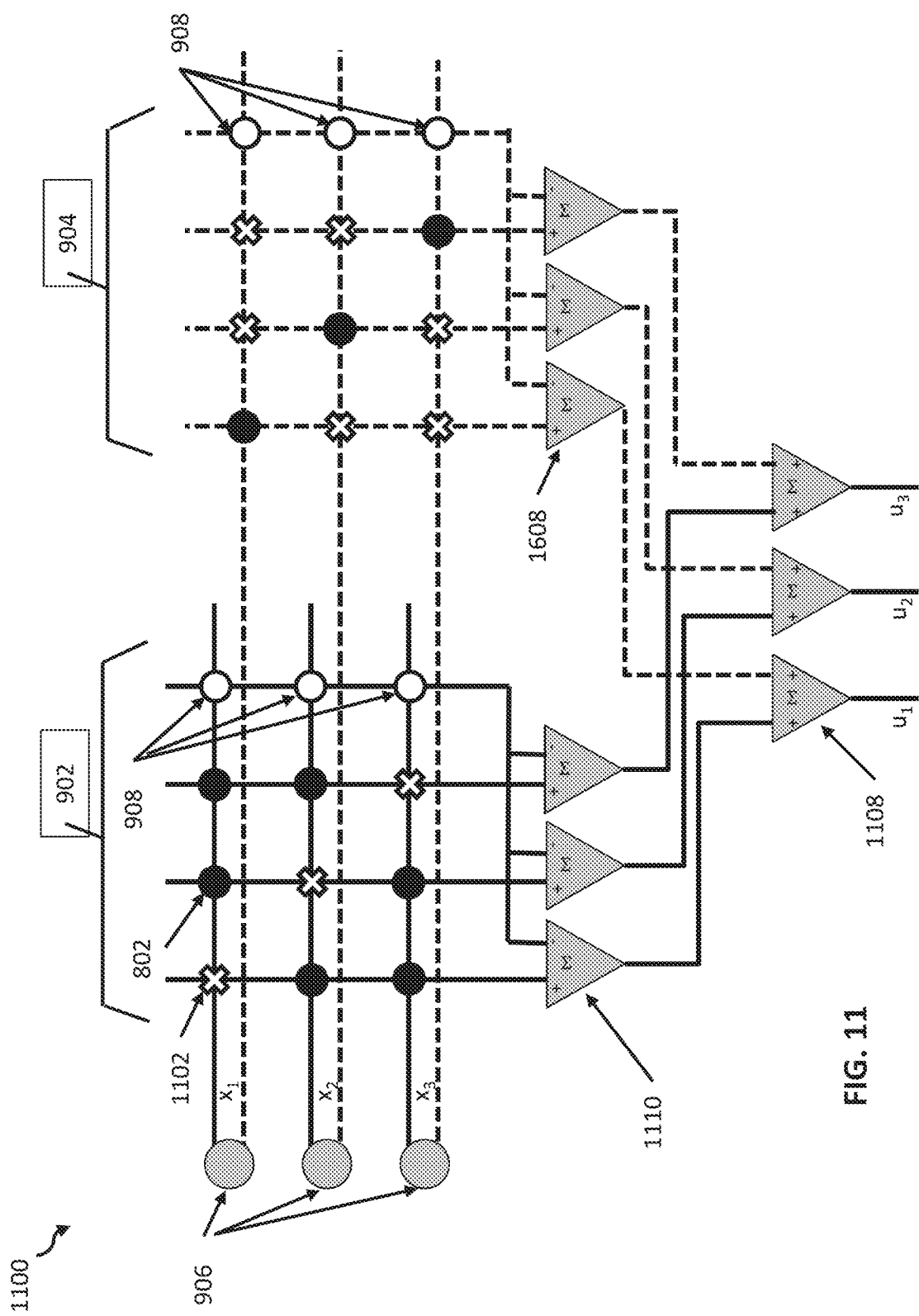
FIG. 11 depicts a flow diagram for performing a forward computation using a neural network composed of resistive device arrays according to some embodiments.

As previously discussed, in some aspects a learning algorithm may include an initial step of forward computation. FIG. 11 depicts forward computation using a network of resistive device arrays, according to some embodiments. Referring now to FIG. 11, each of the two matrices 902 and 904 may comprise resistive devices 802. Matrix values may be stored in each node of the arrays. According to some embodiments input neurons 906 may generate voltage pulses as inputs to both arrays. Array 902 (Array 1 depicted as the left most array) may be configured to calculate the off-diagonal weights while the right-most array 904 can be configured to simultaneously calculate the diagonal weights. Arrays 902 and 904 may receive input voltage pulses from input nodes 906 and perform transformation operations on the voltage pulses by multiplying them by using stored conductance [weight] values at each node. The conductance values are always positive.

In some embodiments, network 1100 may calculate the conductance at each neuron based on a reference conductance on reference neurons 908. In some aspects, network 1100 may use the reference conductance 908 as a threshold in comparative operations. Network 1100 may also use reference conductance to encode negative values using only the positive conductance values (which can only be positive). Network 1100 may read the output current downstream at $u_1$, $u_2$, and $u_3$ (collectively $u_i$), which may provide the output interpreted from a current reading at the output nodes 1108. In some aspects, system 1100 may perform the weight matrix multiplication using only resistive devices 802 and 908. Accordingly, the resultant output may be a solution for the forward computation operations.

Figure 12:
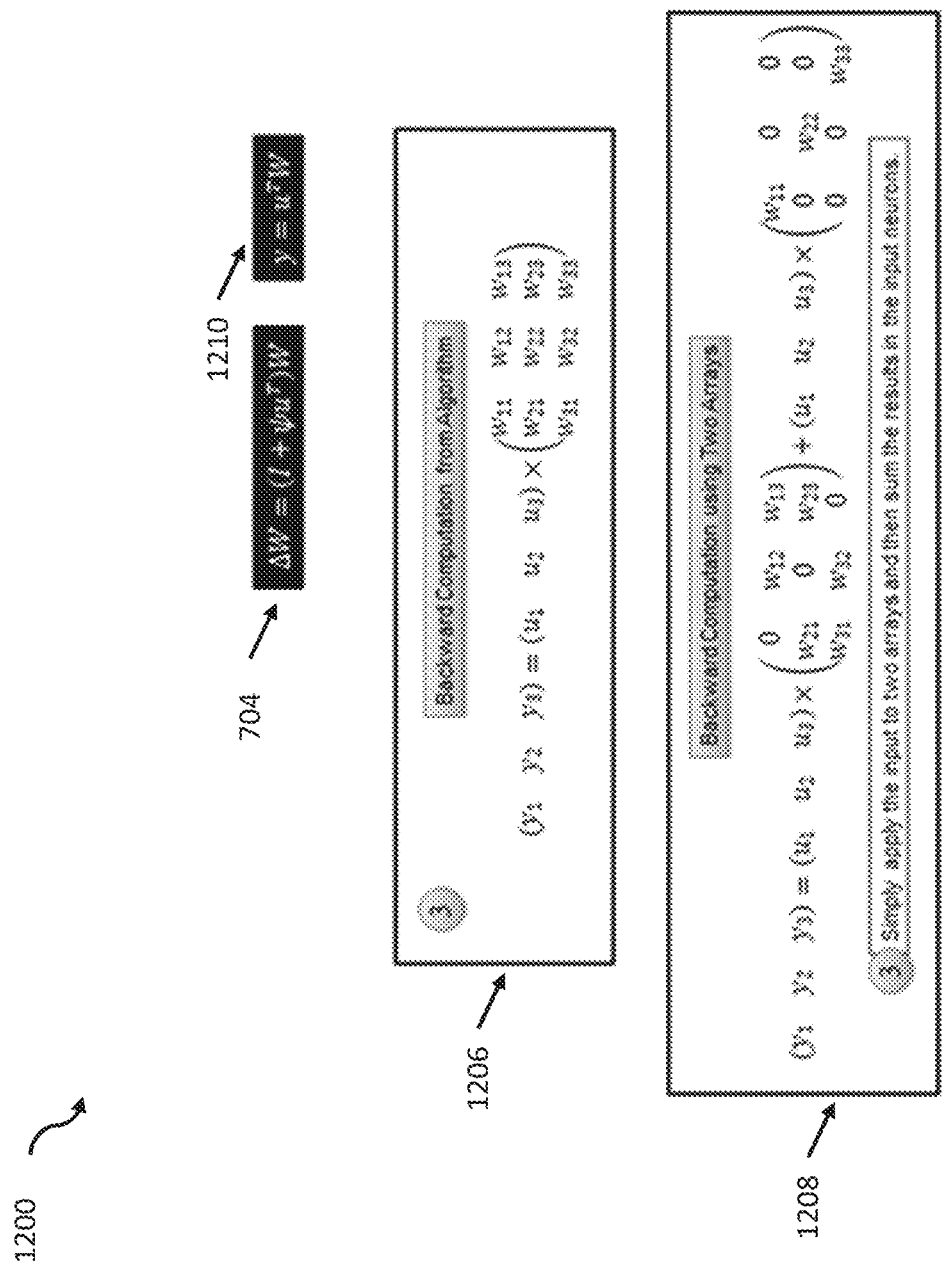
FIG. 12 depicts a mathematical model for performing backward computation using a neural network composed of resistive device arrays according to some embodiments.

After completion of the forward computation, according to some embodiments, network 1100 may perform backward computation. FIG. 12 depicts a mathematical model 1200 for performing backward computation using a network of resistive device arrays, according to some embodiments. Referring now to FIG. 12, a linear transformation of a matrix (e.g., matrix W) is depicted at equation 1210. Equation 704 depicts an update rule for matrix W. According to some embodiments, outputs $y_i$, interpreted as one or more current values, may provide the solutions to the backward computation operation.

Figure 13:
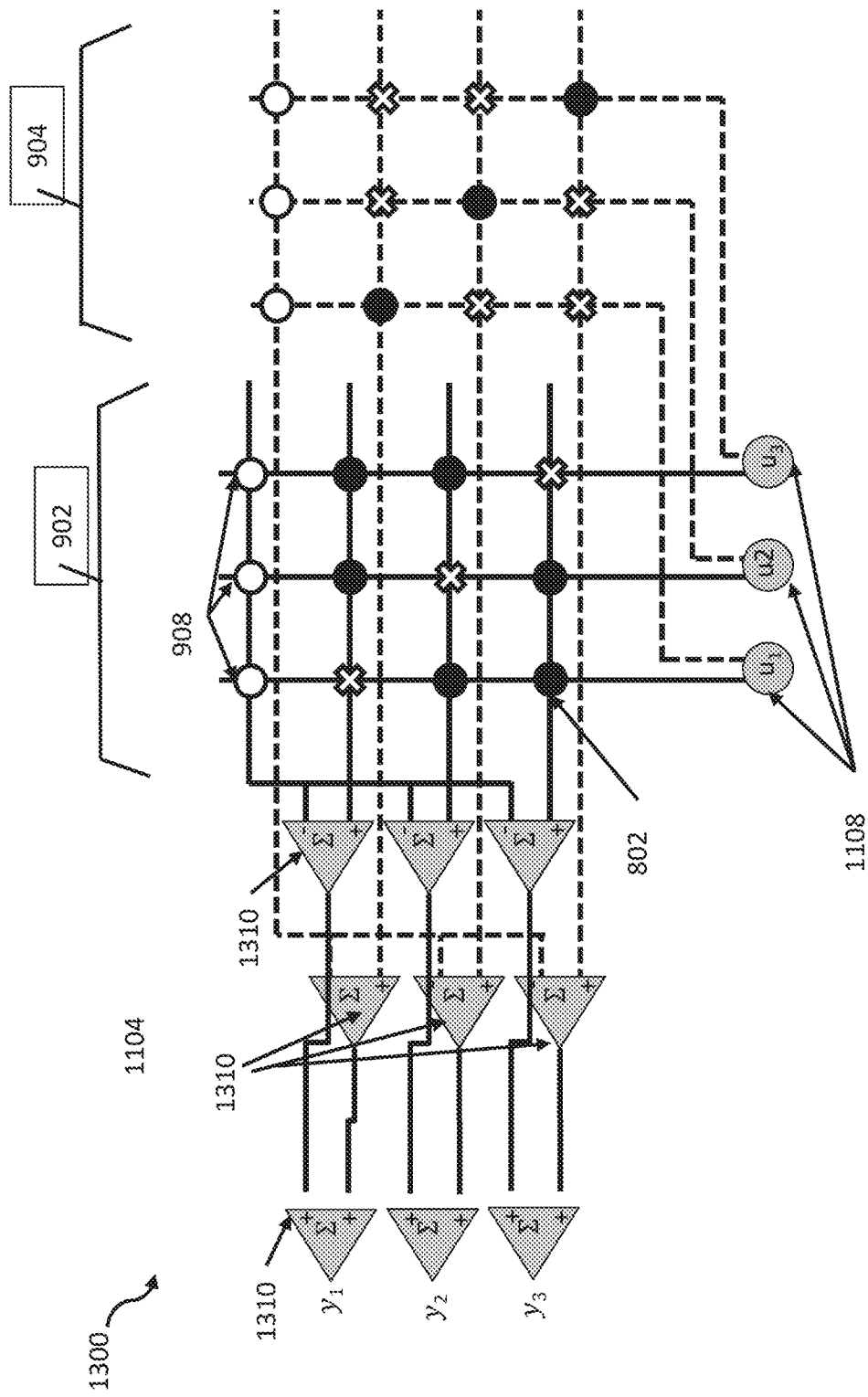
FIG. 13 depicts a flow diagram for performing backward computation using a neural network composed of resistive device arrays according to some embodiments.

FIG. 13 depicts a flow diagram for performing backward computation using a network of resistive device arrays 1300, according to some embodiments. Network 1300 again shows arrays 902 and 904, which may now receive voltage pulses from/I, as the inputs to the arrays. According to some embodiments, network 1300 may read the voltage pulses at resistive devices 1302 and compare the pulses to reference conductance values at resistive devices 1308. In some aspects, network 1300 may then sum the outputs of resistive devices 1302 at blocks 1310, and output current values as $y_1$, $y_2$, and $y_3$. According to some embodiments, similar to the forward computation operations, network 1300 may compute the diagonal terms in array 902, calculate the off-diagonal terms in array 904, and then sum at blocks 1108 to provide the solution for backward computation.

Figure 14:
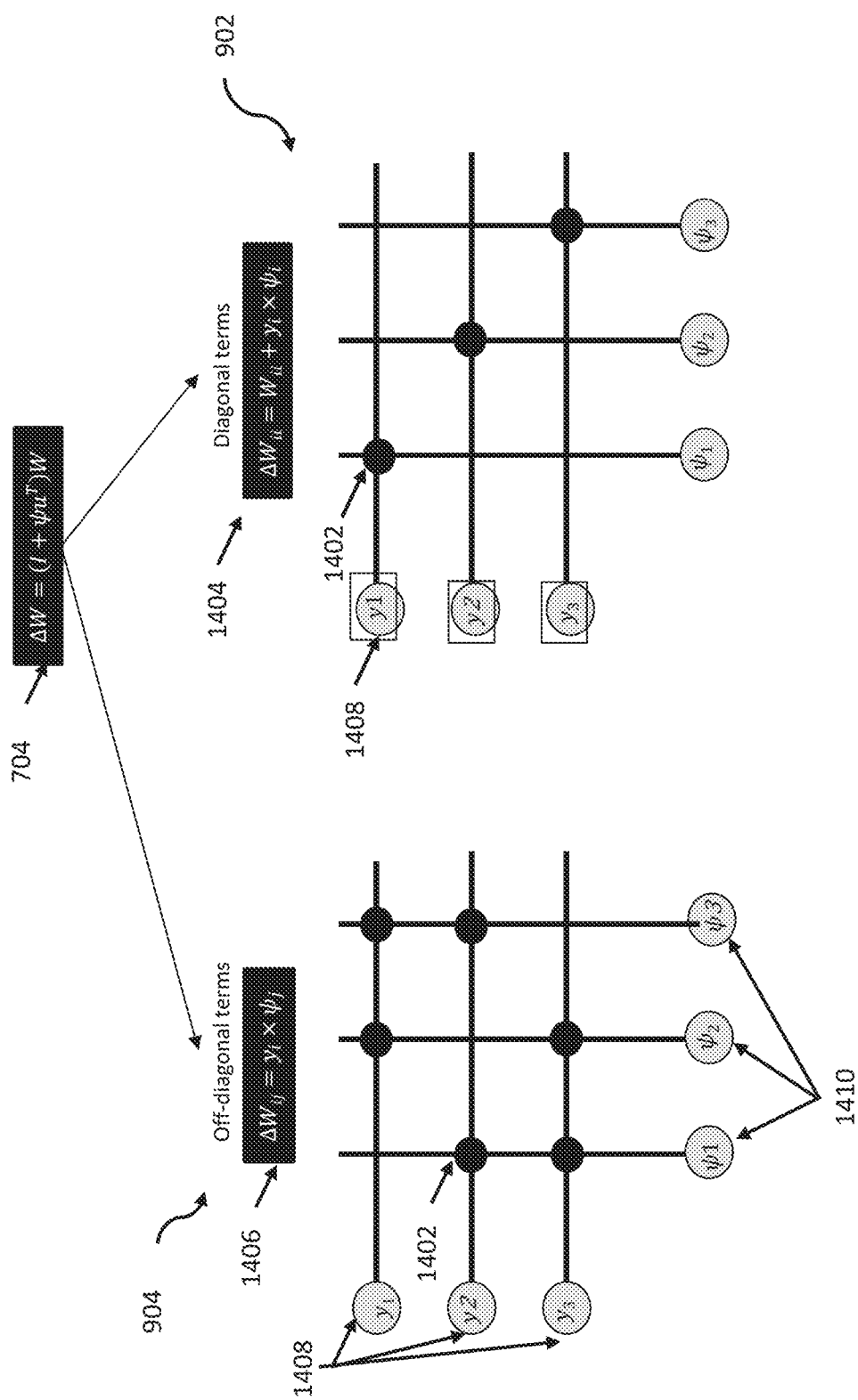
FIG. 14 depicts a flow diagram for performing weight updates using a neural network composed of resistive device arrays according to some embodiments.

Reviewing again the steps for implementing an exemplary learning algorithm, after forward computation (1), and backward computation (2), network 1300 may perform weight updates on the arrays. Referring now to FIG. 14, arrays 902 and 904 depict flow diagrams for a performance of weight updates using a network of resistive device arrays (e.g., network 1300), according to some embodiments. Equation 704 show the mathematical equivalent of updates that need to be applied to arrays 1 and 2 (902 and 904, respectively).

Weight update rules may be different for each of the diagonal terms and the off-diagonal terms of matrix W. For example, according to some embodiments, array 902 (also referenced herein as array 1) may be configured to independently calculate the off-diagonal terms in the form of voltage pulses to its respective resistive devices 1402. Equation 1406 demonstrates the equivalent mathematical model for the calculation performed at array 902 during the weight update operation. Array 904 (also referenced herein as array 2) may calculate the diagonal values of the matrix simultaneously.

With respect to the calculation of the off-diagonal terms calculated in array 902, the weight may be the product of two vectors $y_i$ (which are calculated as input neurons 1408), and $\Psi_j$, which is depicted as output nodes 1410. Array 904 may be configured to calculate values for the diagonal terms $W_{ii}$ of weight matrix W.

According to some embodiments, voltage pulses are shot to the neurons through the columns $y_i$ and rows $\Psi_j$ of arrays 902 and 904. Each respective array may perform the multiplication (as voltage propagation) and change the weights of the matrix slightly using the hardware equivalent of each of a respective one of rules (Equations 1406 and 1404).

Figure 15:
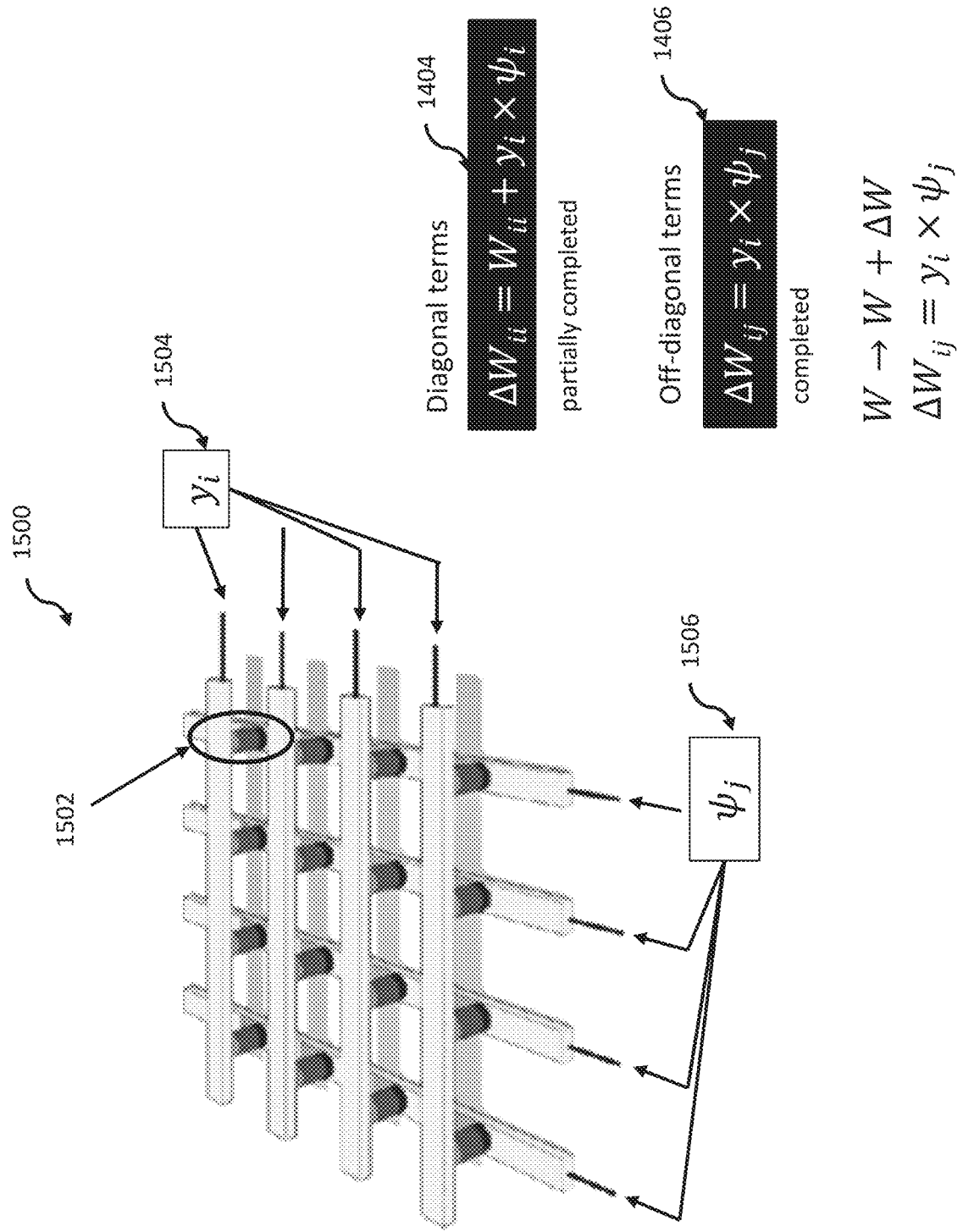
FIG. 15 depicts a crossbar array comprising resistive components according to some embodiments.

Looking more closely at an individual array, FIG. 15 depicts an array 1500 comprising resistive devices 1502, according to some embodiments. Focusing for now on calculation of the diagonal terms, array 1500 depicts an exemplary 4×4 array. Array 1500 may implement update rule 1404 as a function of the location of the architecture. For example, the location of respective resistive device 1502 with respect to columns $y_i$ and $\Psi_j$ may determine the outputs. According to some embodiments, array 1500 may send voltage pulses to both 1506 $y_i$ and rows $\Psi_j$, and each respective device 1502 may interpret the voltage pulse from the respective column and row. According to embodiments described herein, each device may be configured to perform a multiplication operation and change the weight value of a voltage pulse. The multiplication operation is the update to the matrix term. For each respective location (e.g., at resistive device 1502), the update may be $y_i$ multiplied by $\Psi_j$. The input vectors $y_i$ and $\Psi_j$ may be the values computed in the forward and backward computations, respectively, so that system 1500 can create the weight update. Array 1500 may first send pulses to both arrays (the array performing the off-diagonal terms is not depicted in FIG. 15), which are $y_i$ and $\Psi_j$. In some aspects, both arrays in the network update simultaneously by sending $y_i$ multiplied by $\Psi_j$ pulses through both arrays, which performs the update operation. Each device 1502 is capable of updating the weight and storing the weight. In some aspects, updates are performed all together at a constant time independent of number of weights in the whole system without the necessity of extra circuitry at the multiplicity of weights.

Figure 16:
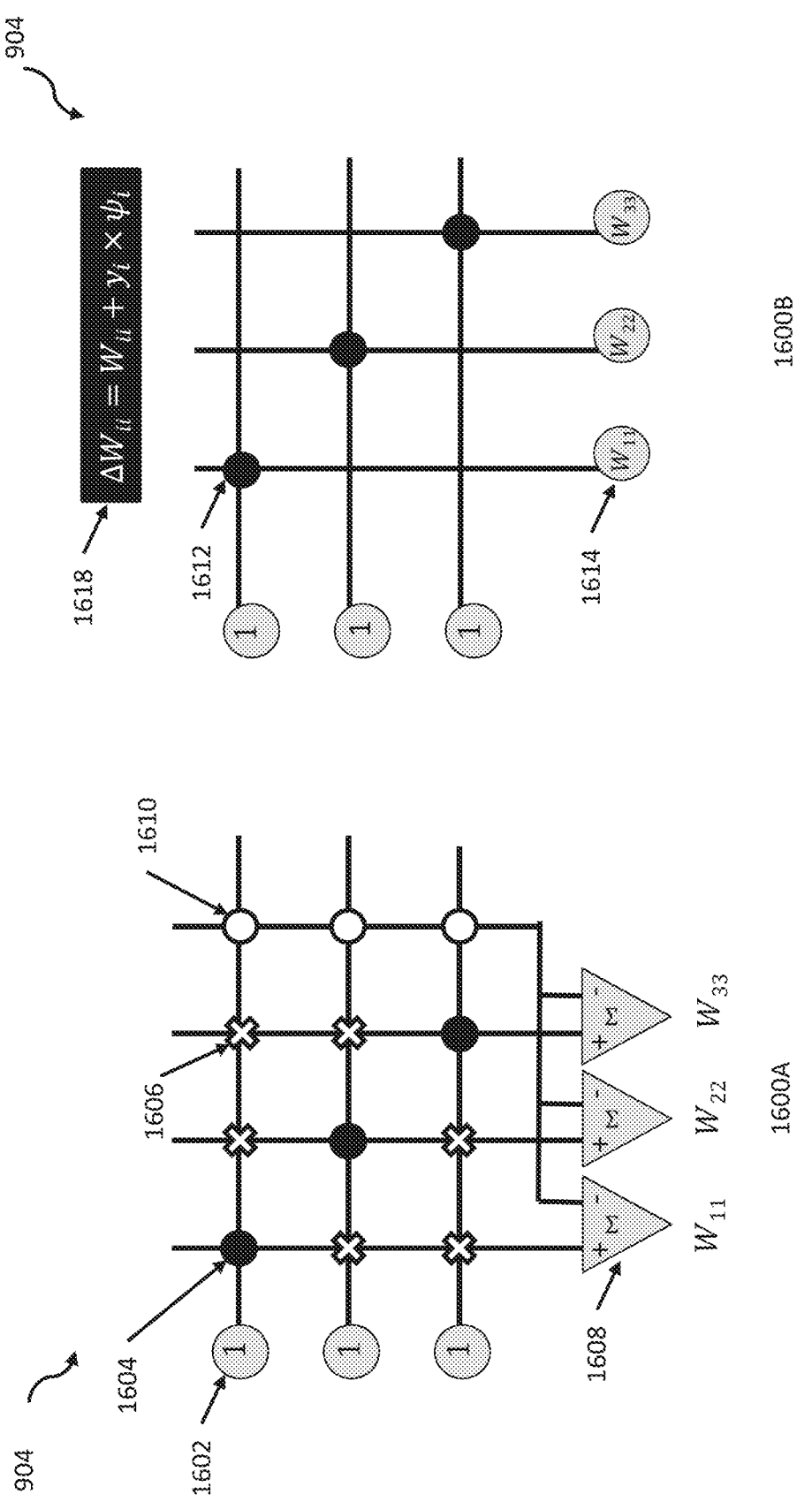
FIG. 16 depicts a flow diagram for performing a second diagonal weight read and update according to some embodiments.

According to some embodiments, the diagonal weight update portion may be a two-step process. FIG. 16 depicts a flow diagram for performing a second diagonal weight read and update on array 904, according to some embodiments. In some aspects, processes 1600A and 1600B both represent two steps of an update process performed on the same array 904. As shown in process 1600A, it may be advantageous to perform an update by sending constant voltages to the inputs 1604 of $W_{ii}$. Equation 1618 depicts the second update process as $\Delta W_{ii}$. The process may include two steps which may be reading the value in nodes 1602, as shown at process 1600A. The constant voltage supplied at nodes 1602 may be read by nodes 1608 as the $W_{ii}$ term.). Accordingly, the array may multiply a constant voltage (by the $W_{ii}$ terms) and send voltage pulses from input nodes 1602 (depicted in FIG. 16 as input nodes (1, 1, 1). Here, process 1600A and process 1600B depict updates the diagonal matrix terms.

In some array locations, there may not be any devices at some intersections of the columns and rows (e.g., at location 1606) as a function of the mathematical operation performed by the array. Conductance nodes 1610 may provide a constant positive conductance as a reference value. According to some embodiments, array 1600A may perform a differential conductance reading to determine if the conductance is higher than reference conductance. If, for example, the conductance at a particular node is higher than the reference conductance then the node has saved within it a positive value. In other aspects, if the conductance is below the reference the node contains a negative value.

In some aspects, arrays 1600A and 1600B may perform updates to the matrices in parallel. For example, the system of FIG. 1600 may update the terms held in array 1600A at the same time as updating the terms in array 1600B.

Figure 17:
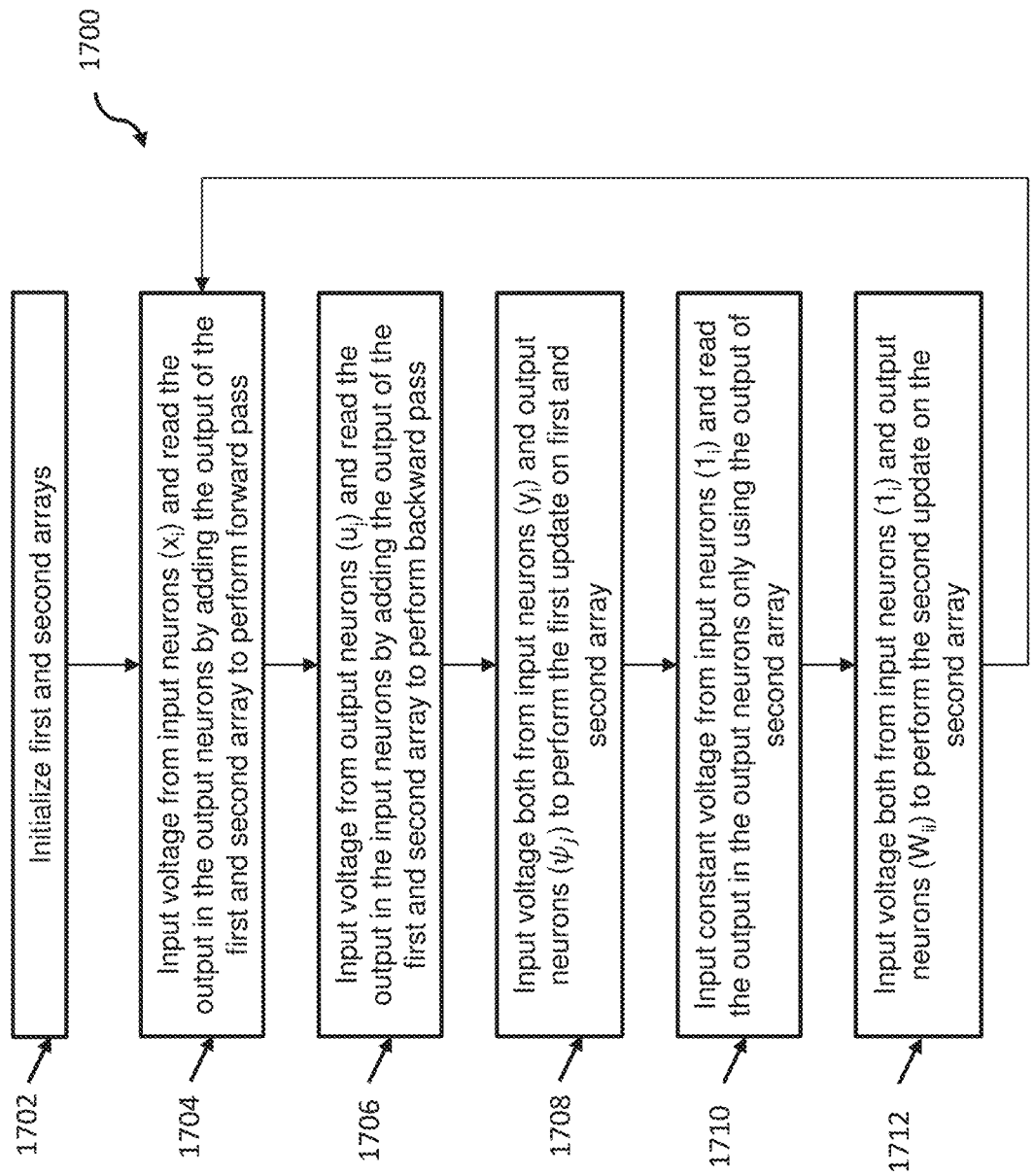
FIG. 17 depicts a method for performing matrix operations using a network of neural networks according to some embodiments.

In summary, FIG. 17 is a flow chart depicting a method 1700 for performing matrix operations using a network of resistive device arrays, according to some embodiments. The network of resistive device arrays may include a first array and a second array, where the first array may be configured to hold a plurality of off-diagonal terms of a weight matrix, and the second array may be configured to hold a plurality of diagonal terms of the weight matrix. Referring now to FIG. 17, according to some embodiments, the system of 1700 (hereafter "system 1700") may initialize the first and second arrays, as shown at block 1702. At block 1704 system 1700 input voltage from input neurons $(x_i)$ and read the output in the output neurons by adding the output of the first and second array to perform forward pass.

As shown at block 1706, system 1700 may input voltage from output neurons $(u_j)$ and read the output in the input neurons by adding the output of the first and second array to perform backward pass.

At block 1708, in some embodiments, the system may input voltage both from input neurons $(y_i)$ and output neurons $(\psi_j)$ to perform the first update on first and second array. At block 1710, the system may also input a constant voltage from input neurons $(1_i)$ and read the output in the output neurons using only the output of second array. Finally at block 1712 system 1700 may input voltage from both input neurons $(1_i)$ and output neurons $(W_{ii})$ to perform the second update on the second array.

According to embodiments discussed thus far, matrix operations are performed with a network of resistive device arrays, where the network is configured to find an independent component using a maximization algorithm. In some embodiments, however, it may be advantageous to provide a network of resistive device arrays capable of performing an actual analog matrix inversion.

Matrix inversion is the process of finding the matrix W that satisfies Equation 1800 for a given invertible matrix B. When performing operations that include matrix inversion, the inverse of a matrix having N horizontal components (e.g., in an N×N matrix) may have a time complexity (computing time cost) of $O(N^3)$, where output O has a time function equivalent to $N^3$. Gauss-Jordan elimination is a common method used to find an inverse matrix solution that satisfies this computing time cost rule. Accordingly, systems may solve an N×N matrix with $N^3$ operations. In other terms, using Gauss-Jordan elimination in a conventional computing architecture, a matrix inversion can be solved with $N^3$ calculation steps at a minimum. It may be advantageous, however, to provide methods and systems configured to provide a solution to a matrix inversion problem with fewer steps than matrix inversion computed in conventional von Neumann architecture, with fewer computational steps.

A matrix W may be solved by multiplying C with an inverse of matrix B. According to some embodiments, the solution to matrix W can be computed using analog signals stored in a network of resistive device arrays with a time complexity of $O(N)$. Stated in other terms, according to some embodiments, a matrix of the order N can be solved in N steps, thereby reducing the number of computational steps by a factor of $N^2$.

Figure 18:
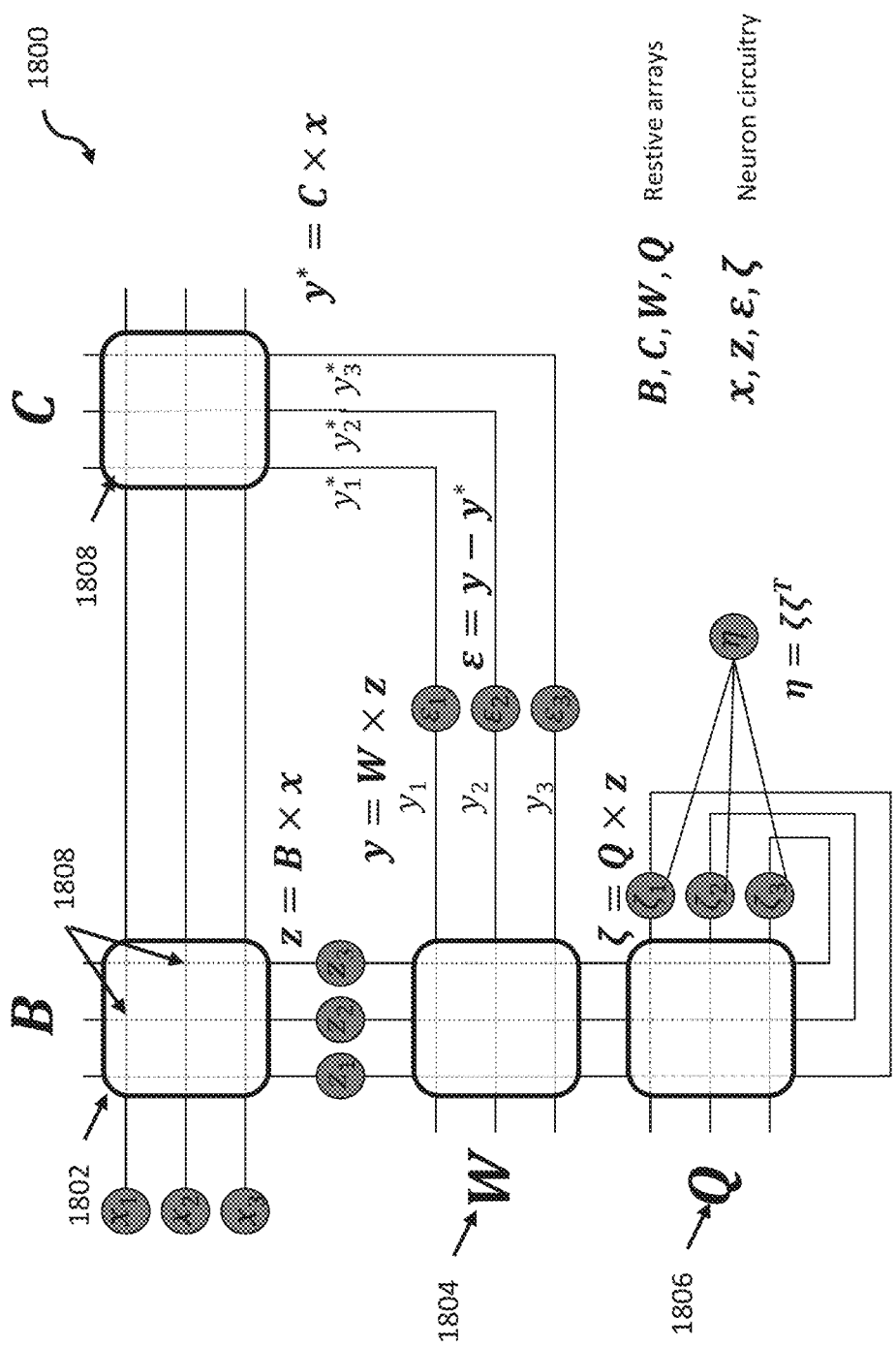
FIG. 18 depicts a flow diagram for performing analog matrix inversion using a neural network composed of resistive device arrays for according to some embodiments.

FIG. 18 depicts a network of resistive device arrays 1800 for performing analog matrix inversion according to some embodiments. Referring now to FIG. 18, network 1800 may include arrays 1802, 1804, 1806, and 1808 (depicted as arrays B, W, Q, and C, respectively). According to some embodiments, arrays 1802-1808 may be comprised of resistive devices at each array node (e.g., array nodes 1810). Although network 1800 depicts arrays 1802-1808 each having 3×3 weighted connections (resistive devices), it should be appreciated that any order of array is contemplated. According to some embodiments, a network having arrays with N vectors may solve an inverted matrix having N diagonal terms.

Network 1800 depicts array 1802 (array B) having input nodes $x_1$, $x_2$, and $x_3$ (collectively $x_i$), and outputs $z_1$, $z_2$, and $z_3$ (collectively $z_i$), which may be inputs to arrays 1804 (array W) and 1806 (array Q). Matrix 1808 (matrix C) may receive inputs from x and outputs y*. In some aspects, output y* may satisfy the equation y*=C×x. Matrix 1804 (matrix W) may receive inputs $z_i$, and outputs $y_i$. Network 1800 may derive $\varepsilon_i$ by a performing comparison of y (which is the product of W and z) with y*. Output nodes $\zeta_i$, according to embodiments, are the product of matrix 1806 (matrix Q) and outputs to matrix 1802 (outputs $z_i$).

According to some embodiments, $x_i$ is the input, $z_i$, $y_i$, and $\varepsilon_i$ may be intermediate inputs to matrices W and Q. In some aspects, intermediate inputs $z_i$, $y_i$, and $\varepsilon_i$ may read input currents and send signals out in both directions (e.g., $z_i$ has an output branch going to both of matrices W and Q (1804 and 1806, respectively)). Accordingly, $\varepsilon_i$ can read values from both of C and W, and compare the values.

Figure 19:
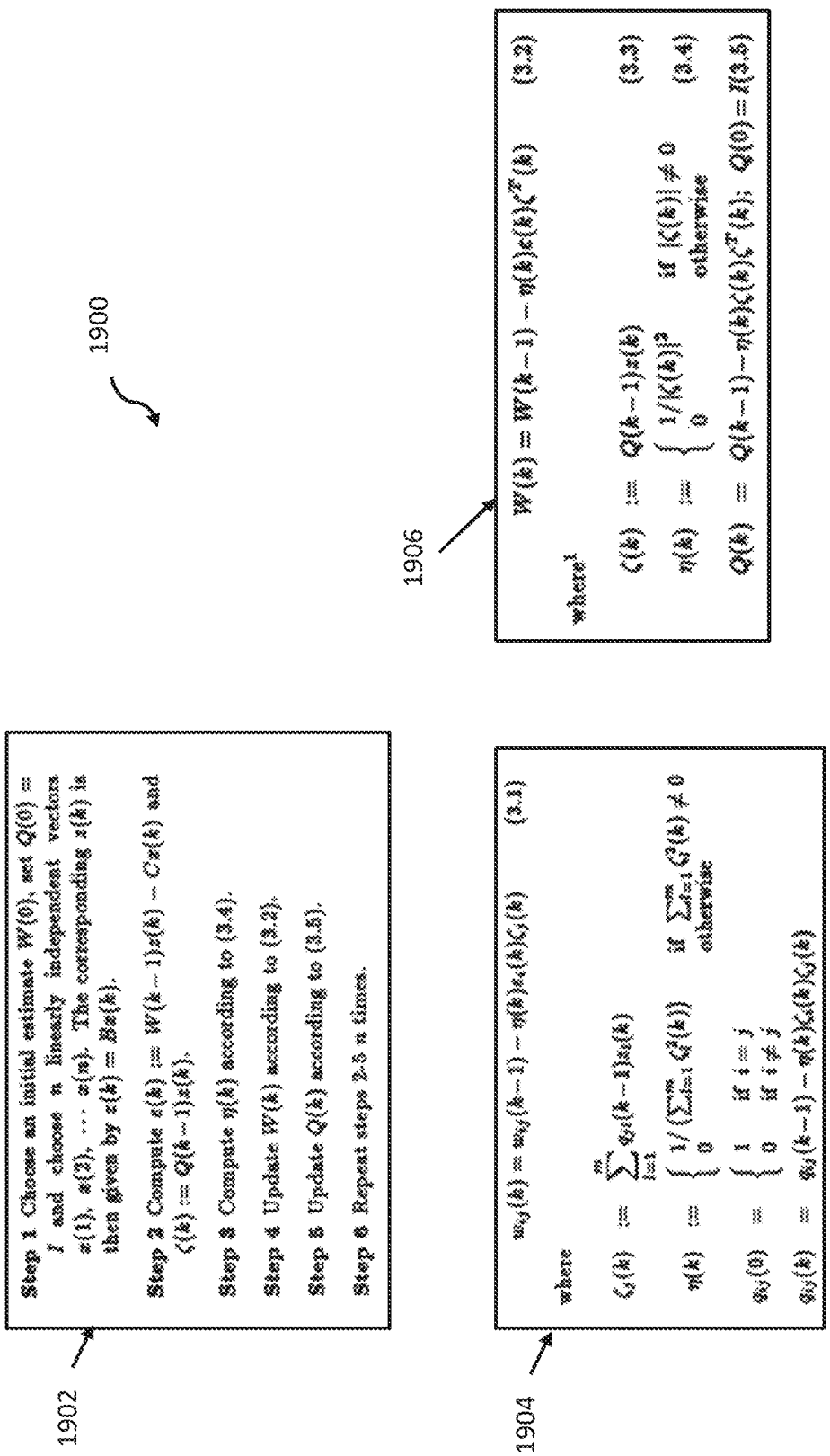
FIG. 19 depicts a mathematical model for performing analog matrix inversion according to some embodiment.

With the architecture depicted in network 1800, according to some embodiments, network 1800 having arrays with N terms may solve matrices with N diagonal terms, may accomplish a solution for matrix inversion using only N operations. FIG. 19 depicts a mathematical model 1900 that presents mathematical algorithms 1902 and 1904 having exemplary steps that correspond to a mathematical equivalent of the output of system 1800. Block 1906 depicts a mathematical equivalent of the variables presented in blocks 1902 and 1904.

Figure 20:
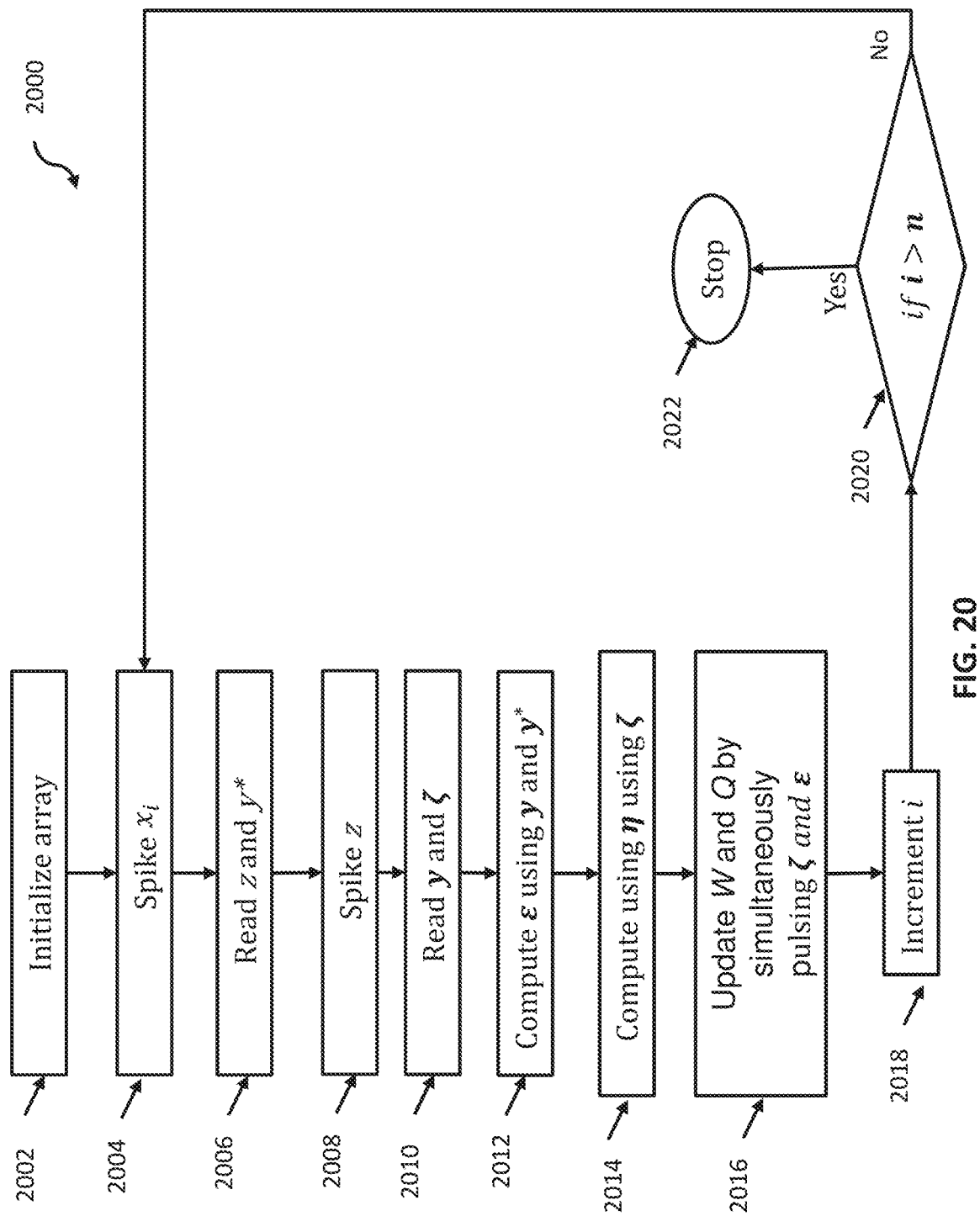
FIG. 20 depicts a flow diagram of a method for performing matrix operations having a time complexity of O(n) with a network of resistive device arrays.

Referring now to FIG. 20, a flow diagram of a method 2000 for performing matrix operations having a time complexity of O(n) with a network of resistive device arrays, in accordance with an exemplary embodiment. As shown in block 2002, the system of method 2000 (hereafter "system 2000") may initialize an array of operatively connected resistive devices. It should be appreciated that, according to some embodiments, system 2000 may be comprised of arrays having n diagonal resistive devices (where network 1800 depicts arrays having n=3 resistive devices).

At step 2002, system 2000 may initialize all of the arrays in network 2100. For example, system 2100 may initialize array W with random values, initialize arrays Q and C with the identity matrix, and initialize an incrementing placeholder i=1. According to some embodiments, system 2000 may sequentially increment placeholder i may to a predetermined value corresponding to the number of necessary steps for a solution to the matrix inversion (e.g., N).

At block 2004, system 2000 may spike the term $x_i$, then read values for terms $z_i$ and $y*_i$, as shown in block 2006. According to some embodiments, a spike may include delivering a predetermined number of voltage pulses to one or more resistive devices. For example, in some embodiments a spike may equal 10 pulses sent from one or more array input nodes and through the columns and/or rows of the array.

System 2000 may next spike term $z_i$, as seen at block 2008. In some embodiments, system 2000 may next read values for $y_i$ and $\zeta_i$, then at block 2012 compute $\varepsilon_i$ using values $y_i$ and $y*_i$, which depicted at block 2010.

In some embodiments, as shown in block 2014, system 2000 may compute values for $\eta$ using values from $\zeta_i$.

Accordingly, in some aspects, system 2000 may update values for matrices W and Q by simultaneously pulsing values $\zeta_i$ and $\varepsilon_i$.

System 2000 may next increment i, as depicted in block 2018. As depicted in block 2002, system 2000 may determine whether i is now greater than n, where n is the number of diagonal terms in any of matrices W, Q, B, and C. As shown at block 2022, system 2000 may stop responsive to determining that i is indeed greater than n. If i is not greater than n, system 2000 may iteratively repeat the operations of blocks 2004-2020 until i is incremented to a value greater than n.

Figure 21:
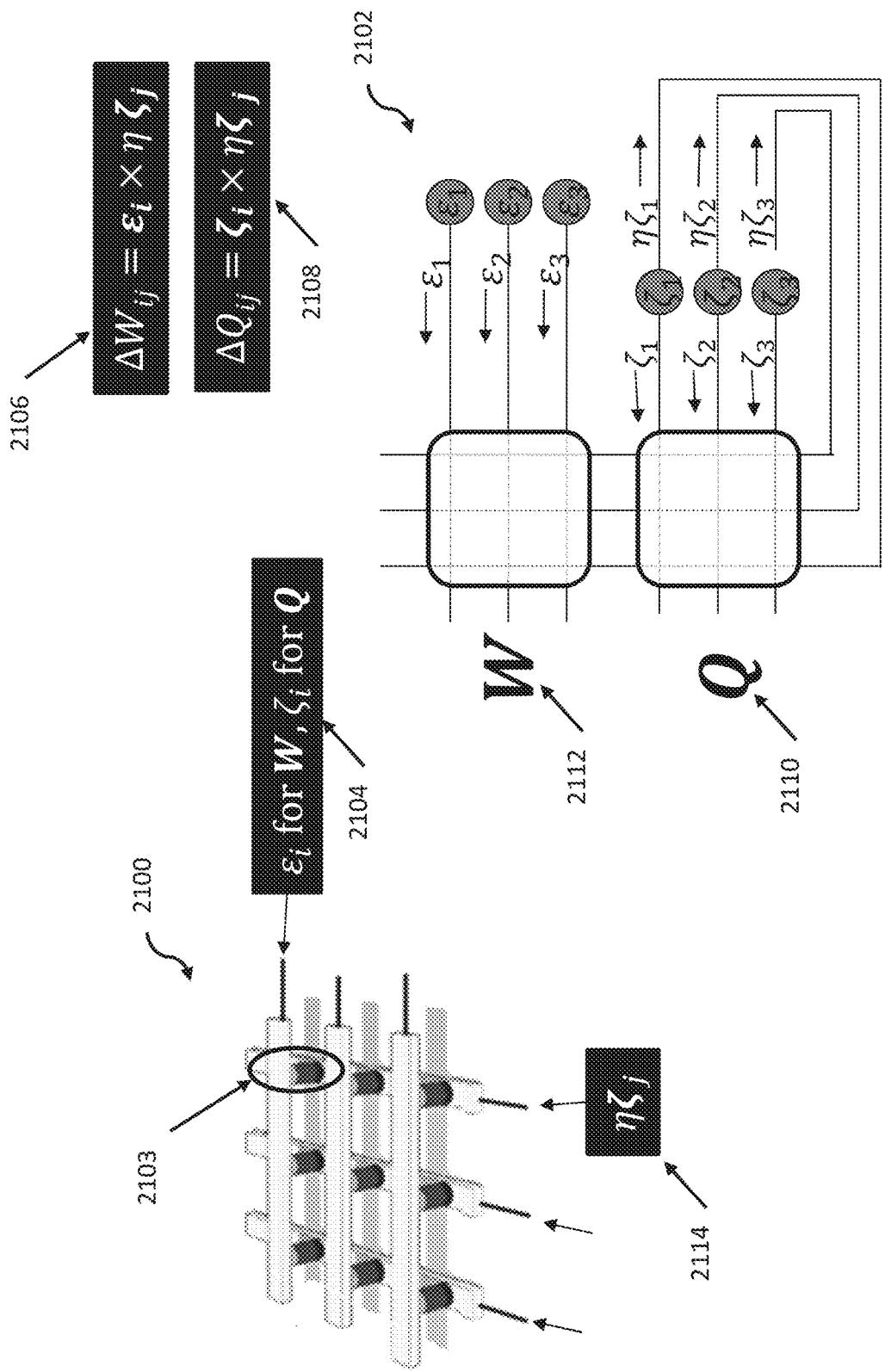
FIG. 21 depicts a resistive device array and flow diagram in accordance with exemplary embodiments.

Referring now to FIG. 21, a resistive device array 2100 and flow diagram 2102 are depicted, in accordance with exemplary embodiments. Resistive device 2103 may be a single resistive device as previously discussed herein. Array 2100 is depicted as having N=3 diagonal resistive devices 2203 in the array.

Looking at array 2100 now in greater detail, inputs 2104, being the input rows, may receive input values $\zeta_i$ for array Q and $\varepsilon_i$ for array W. Inputs 2114, being the column inputs to array 2100, may receive inputs $\eta\zeta_i$. According to some embodiments, inputs $\eta\zeta_i$ as depicted in network section 2102, may be provided as intermediary inputs $\eta\zeta_i$, which are depicted as having values pushed to both of rows of array Q and the columns of array Q. Blocks 2106 and 2108 depict updates to arrays W and Q that, in some embodiments, may update matrices W and Q to output inverted matrix W. Similar to previously described embodiments herein, device array 2100 may interpret output values as current at the output nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments described herein may apply applications directed to the principle of redundancy reduction, such as, for example, biological sensory processes including quantitative processing of retinal information. Information maximization algorithms may also have application in any independent component analysis and principal component analysis.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for performing matrix operations at a constant time complexity, the system comprising:
   a plurality of resistive devices arranged in a network of resistive device arrays, the network comprising a first array and a second array;
   wherein each resistive device located in a diagonal of the first array is disconnected;
   wherein each resistive device located in an off-diagonal of the first array is configured to process off-diagonal terms of a weight matrix;
   wherein each resistive device located in an off-diagonal of the second array is disconnected; and
   wherein each resistive device located in a diagonal of the second array is configured to process diagonal terms of the weight matrix.

2. The system of claim 1, wherein each resistive device located in an off-diagonal of the first array is connected.

3. The system of claim 1, wherein each resistive device located in a diagonal of the second array is connected.

4. The system of claim 1 further comprising a first resistive device in the first array and a second resistive device in the second array.

5. The system of claim 4, wherein the first resistive device comprises a first conductance and the second resistive device comprises a second conductance.

6. The system of claim 5, wherein the first conductance and the second conductance are updated in parallel at a constant time independent of a size of the first array or a size of the second array.

7. The system of claim 1, wherein each resistive device is configured as a weighted connection between neurons of an artificial neural network array.

8. The system of claim 7, wherein the first array is configured to hold a plurality of off-diagonal terms of a weight matrix of the artificial neural network array and the second array is configured to hold a plurality of diagonal terms of the weight matrix.

9. A non-transitory computer-readable storage medium storing computer executable instructions configured to cause a processor to perform a method for performing matrix operations on a matrix with a network of resistive device arrays, the method comprising:

configuring a first array to hold only off-diagonal terms of a weight matrix, wherein each resistive device in the network of resistive device arrays located in a diagonal of the first array is disconnected, and wherein each resistive device located in an off-diagonal of the first array is configured to process off-diagonal terms of the weight matrix;

configuring a second array to hold only diagonal terms of the weight matrix, wherein each resistive device located in an off-diagonal of the second array is disconnected, and wherein each resistive device located in a diagonal of the second array is configured to process diagonal terms of the weight matrix; and initializing the first array and the second array with a random voltage value.

10. The non-transitory computer-readable storage medium of claim 9, wherein the first array comprises a first resistive device and the second array comprises a second resistive device.

11. The non-transitory computer-readable storage medium of claim 10, wherein the first resistive device comprises a first conductance and the second resistive device comprises a second conductance.

12. The non-transitory computer-readable storage medium of claim 11, wherein the first conductance and the second conductance are updated in parallel at a constant time independent of a size of the first array or a size of the second array.

13. The non-transitory computer-readable storage medium of claim 12, wherein each resistive device is configured as a weighted connection between neurons of an artificial neural network array.

* * * * *